United States Patent
Kai et al.

(10) Patent No.: US 9,199,547 B2
(45) Date of Patent: Dec. 1, 2015

(54) NON-CONTACT CHARGING DEVICE

(75) Inventors: Toshihiro Kai, Yamato (JP); Throngnumchai Kraisorn, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 308 days.

(21) Appl. No.: 13/991,966

(22) PCT Filed: Nov. 16, 2011

(86) PCT No.: PCT/JP2011/076428
§ 371 (c)(1),
(2), (4) Date: Jun. 6, 2013

(87) PCT Pub. No.: WO2012/090613
PCT Pub. Date: Jul. 5, 2012

(65) Prior Publication Data
US 2014/0111152 A1    Apr. 24, 2014

(30) Foreign Application Priority Data
Dec. 27, 2010   (JP) ................. 2010-290133

(51) Int. Cl.
*H02J 7/00*    (2006.01)
*B60K 6/20*    (2007.10)
(Continued)

(52) U.S. Cl.
CPC .......... *B60L 11/1829* (2013.01); *B60L 11/182* (2013.01); *B60L 11/1833* (2013.01); *B60L 11/1846* (2013.01); *B60L 11/1861* (2013.01); *H01M 10/44* (2013.01); *H02J 5/005* (2013.01); *H02J 7/025* (2013.01); *B60L 2210/30* (2013.01); *B60L 2240/545* (2013.01);
(Continued)

(58) Field of Classification Search
CPC ....................................................... H02J 7/025
USPC ............................................................. 320/108
See application file for complete search history.

(56) References Cited

U.S. PATENT DOCUMENTS

| | | | | |
|---|---|---|---|---|
| 5,821,731 A | * | 10/1998 | Kuki et al. | ..... 320/108 |
| 2005/0077872 A1 | | 4/2005 | Single | |
| 2009/0146608 A1 | * | 6/2009 | Lee | ..... 320/108 |

FOREIGN PATENT DOCUMENTS

| JP | 09-215211 A | 8/1997 |
|---|---|---|
| JP | 11-341694 A | 12/1999 |

(Continued)

OTHER PUBLICATIONS

Decision on Grant, dated Oct. 2, 2014, from the corresponding Russian Application No. 2013135263, with English translation.

*Primary Examiner* — Edward Tso
*Assistant Examiner* — Ahmed Omar
(74) *Attorney, Agent, or Firm* — Young Basile

(57) ABSTRACT

A non-contact charging device is provided with: a power receiving device which has at least a power receiving coil which receives electrical power, in a non-contact manner, from a power transmitting coil by means of a magnetic connection; a battery which is charged by the electrical power; a charge-state detection means, which detects the charge-state of the battery; a position detection means which detects the position of the power transmitting coil; and a charge time calculation means, which calculates a first charge time for the battery according to the charge-state as detected by the charge-state detection means and a first position of the power transmitting coil as detected by the position detection means.

13 Claims, 19 Drawing Sheets

(51) Int. Cl.
*B60L 11/18* (2006.01)
*H01M 10/44* (2006.01)
*H02J 7/02* (2006.01)
*H02J 5/00* (2006.01)

(52) U.S. Cl.
CPC ....... *B60L 2240/622* (2013.01); *B60L 2240/80* (2013.01); *B60L 2250/16* (2013.01); *Y02T 10/705* (2013.01); *Y02T 10/7005* (2013.01); *Y02T 10/7044* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---|---|
| JP | 2002369398 A | 12/2002 |
| JP | 2009-089452 A | 4/2009 |
| JP | 2010098896 A | 4/2010 |
| JP | 2010172185 A | 8/2010 |
| JP | 2011217461 A | 10/2011 |
| RU | 2180465 C1 | 3/2002 |
| RU | 2306653 C1 | 9/2007 |
| RU | 2349464 C2 | 3/2009 |
| WO | 2010-052785 A1 | 5/2010 |

\* cited by examiner

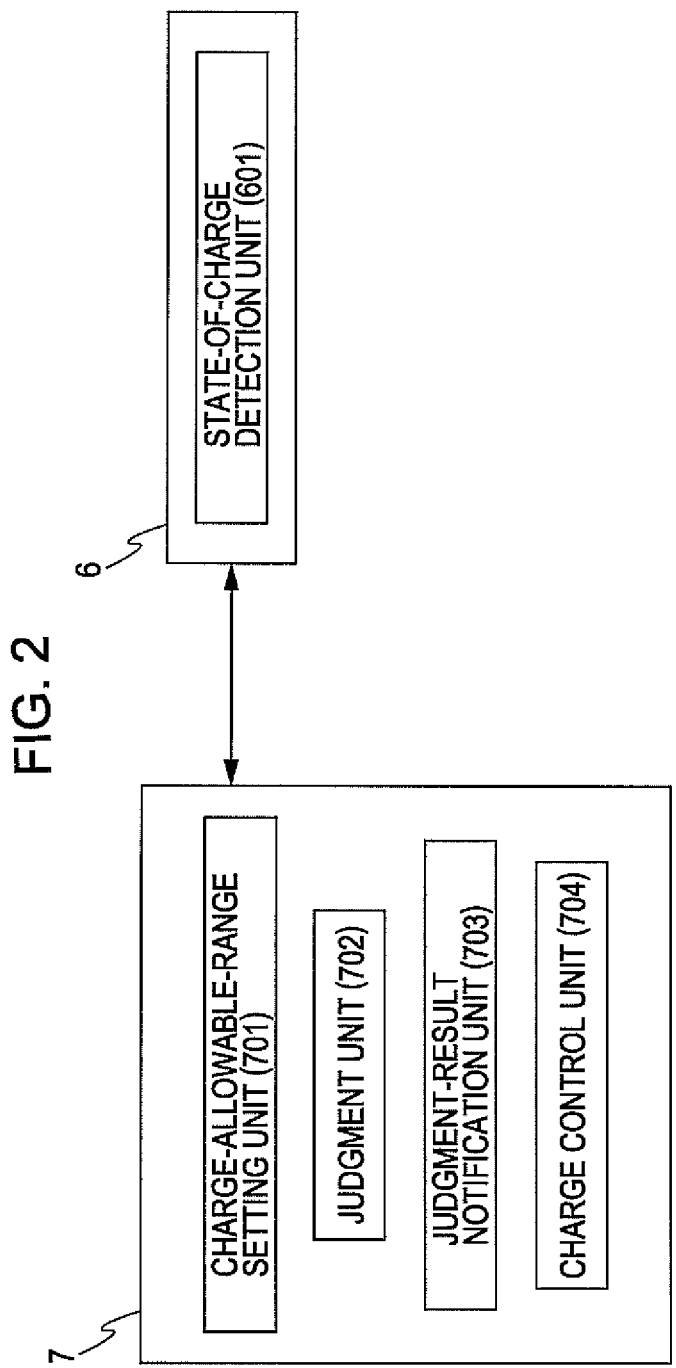

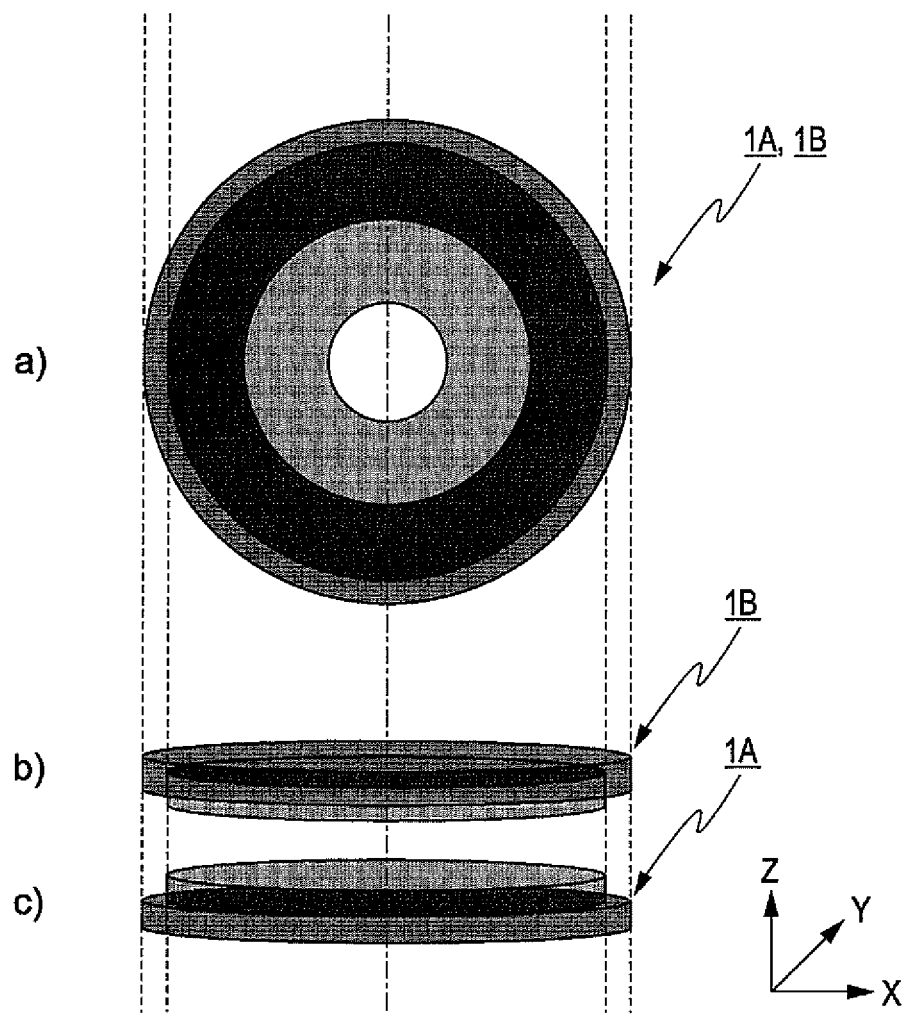

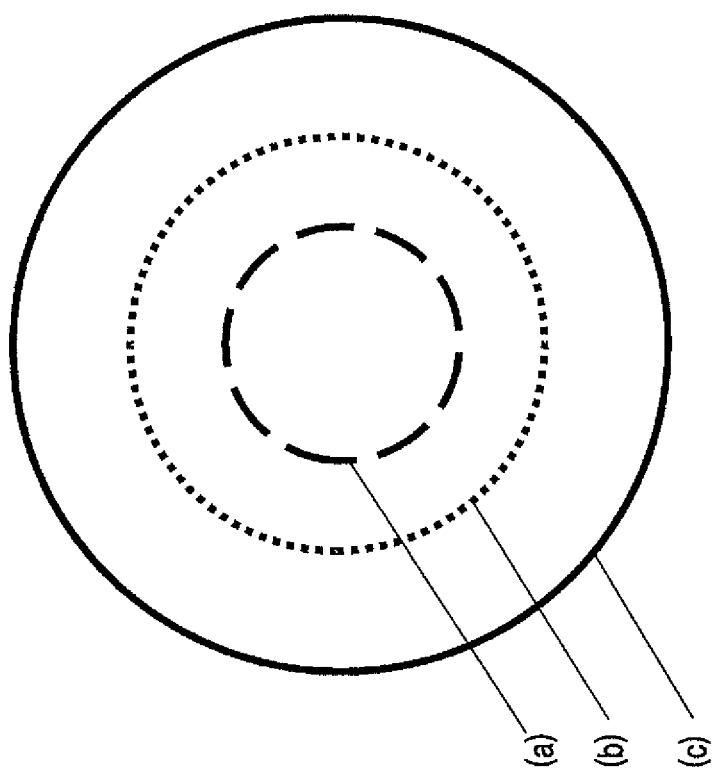

NON-CONTACT CHARGING DEVICE

TECHNICAL FIELD

The present invention relates in general to a non-contact charging device.

BACKGROUND

Japanese Unexamined Patent Application Publication No. 2009-89452 discloses a charging system including a charging device that, when a vehicle is stopped at a predetermined position, is previously arranged near a stop position and charges a battery mounted on the vehicle. A portable device is held by a driver of the vehicle and has a communication function. A vehicle-side communication device is mounted on the vehicle and makes communication with the portable device. A battery charge control unit is mounted on the vehicle, and starts the charge for the battery if it is judged that the driver moves away from the vehicle, and ends the charge for the battery if it is judged that the driver moves toward the vehicle based on the communication result of the vehicle-side communication device with the portable device. The charging system transmits and receives power through electromagnetic coupling while a non-contact state is held between a power receiving unit of the vehicle and a power feeding unit of the charging device.

However, the allowance of the charge is not judged based on the position of the power receiving unit and the position of the power transmitting unit, and a user cannot recognize the tolerance of a shift of the position of the power transmitting unit with respect to the position of the power receiving unit. This configuration is not convenient for the user of the vehicle.

BRIEF SUMMARY

The subject matter to be addressed by the present invention is to provide a non-contact charging device that increases convenience for a user.

The present invention addresses the above-described problem by including state-of-charge detection means for detecting a state of charge of a battery and a charge-time calculation means for calculating a charge time of the battery in accordance with the state of charge detected by the state-of-charge detecting means and a position of a power transmitting coil.

With the present invention, a charge allowable range is set in accordance with the state of charge, or a charge time is calculated in accordance with the state of charge and the position of a power transmitting coil. For example, if the state of charge is high, since the amount of power required for the charge is small, by widely setting the charge allowable range, a range for allowing a positional shift of the power transmitting coil can be expanded. For another example, even if the charge time is long due to the positional shift of the power transmitting coil, the charge can be started by determination of the user who has recognized the charge time. As the result, convenience for the user can be increased.

BRIEF DESCRIPTION OF THE DRAWINGS

The description herein makes reference to the accompanying drawings wherein like reference numerals refer to like parts throughout the several views, and wherein:

FIG. 2 is a block diagram of a battery controller and an electronic control unit in FIG. 1.

FIG. 3A provides a plan view and perspective views showing a state in which a power transmitting coil and a power receiving coil in FIG. 1 face each other.

FIG. 7 is an illustration for explaining a charge allowable range set by a charge-allowable-range setting unit in FIG. 2.

DETAILED DESCRIPTION

Hereinafter, non-contact charging devices according to embodiments of the present invention are described with reference to the drawings.

Figure 1:
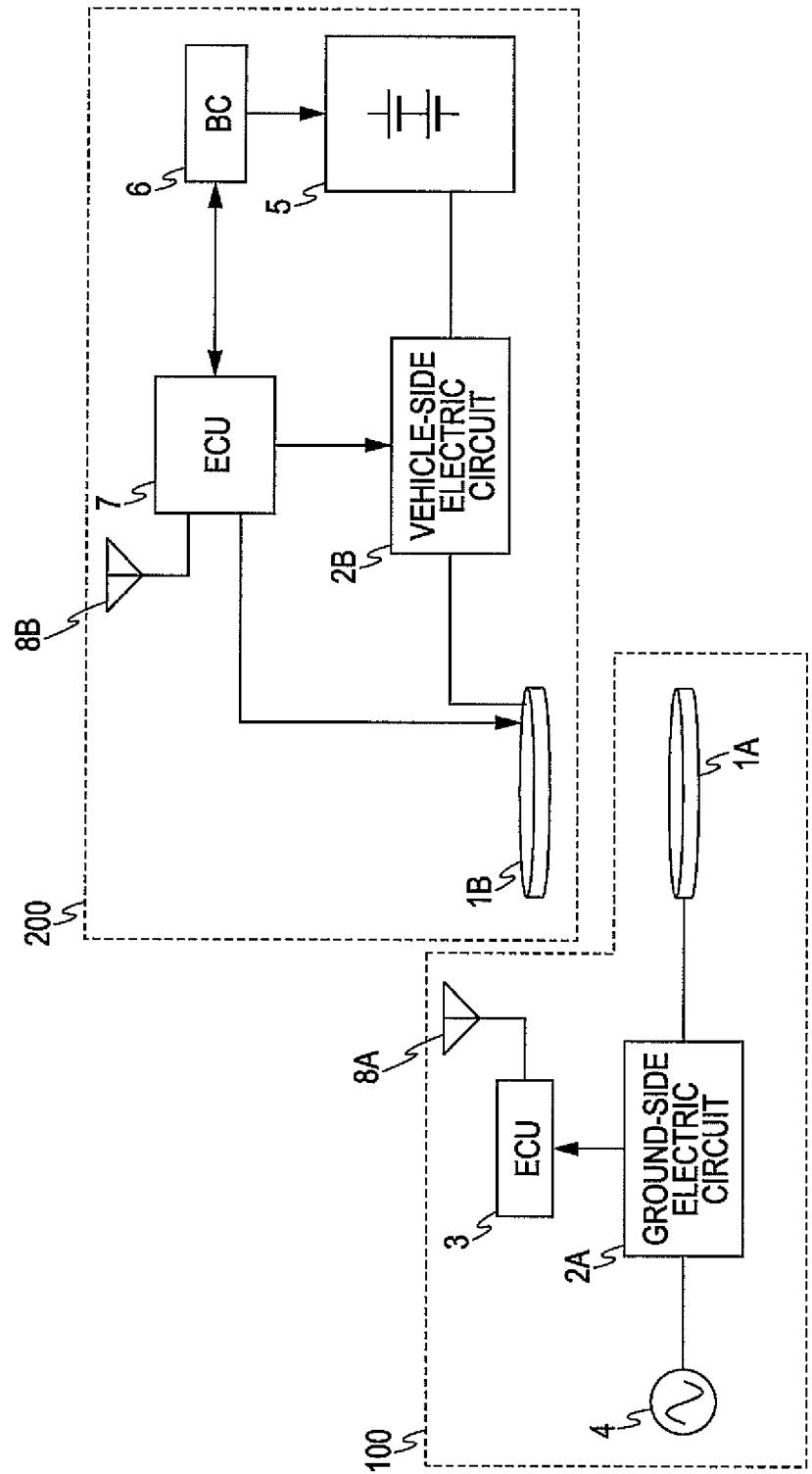
FIG. 1 is a block diagram of a non-contact charging system according to an embodiment of the present invention.

FIG. 1 is a block diagram showing a non-contact charging system to which an embodiment of the present invention is applied. The system includes a ground-side unit 100 and a vehicle-side unit 200. The ground-side unit 100 installed at a power feeding stand or the like charges the battery 5 by feeding power in a non-contact manner to a load of a battery 5 or the like of the vehicle-side unit 200 mounted on a vehicle or the like. Described hereinafter in this embodiment is that a non-contact charging device including a non-contact charging system is mounted on a charging apparatus provided in a parking space for a vehicle or in an electric vehicle. However, the non-contact charging device including the non-contact charging system according to this embodiment may be provided on a vehicle other than the electric vehicle, or may be provided in a subject other than the vehicle.

The ground-side unit 100 includes a power transmitting coil 1A, a ground-side electric circuit 2A, an electronic control unit (ECU) 3, a system power supply 4, and a ground-side communication device 8A. The system power supply 4 feeds alternating-current power to the ground-side electric circuit 2A. The ground-side electric circuit 2A is a circuit including a rectifier, a power converter, a resonant circuit, etc., converts the alternating-current power transmitted from the system power supply 4 into alternating-waveform alternating-current power, and transmits the alternating-waveform alternating-current power to the power transmitting coil 1A. The power transmitting coil 1A transmits high-frequency power to a power receiving coil 1B in a non-contact manner by electromagnetic induction effect. The power transmitting coil 1A is provided in a parking space in a parking lot provided with the non-contact charging system according to this embodiment. When a vehicle including the vehicle-side unit 200 is parked in the parking space, the power transmitting coil 1A is positioned below the power receiving coil 1B with a distance held with respect to the power receiving coil 1B. The ECU 3 is a controller that controls the entire ground-side unit 100. The ECU 3 controls the ground-side electric circuit 2A, for example, starts and ends power transmission from the power transmitting coil 1A to the power receiving coil 1B, and adjusts the power transmitted from the power transmitting coil 1A. The ground-side communication device 8A makes communication with a vehicle-side communication device 8B, and transmits a power transmission timing, a transmission power, etc., to the vehicle-side unit 200 based on a control signal of the ECU 3. Also, the ground-side communication device 8A transmits the position of the power transmitting coil 1A to the vehicle-side unit 200.

The vehicle-side unit 200 includes the power receiving coil 1B, a vehicle-side electric circuit 2B, the battery 5, an electronic control unit (ECU) 7, a battery controller (BC) 6, and the vehicle-side communication device 8B. The power receiving coil 1B is a coil that receives the high-frequency power transmitted from the power transmitting coil 1A in a non-contact manner by the electromagnetic induction effect and that is installed at a bottom surface (chassis) or the like of the vehicle including the vehicle-side unit 200. The vehicle-side electric circuit 2B is a circuit including a resonant circuit, a rectifier, a junction block (J/B), etc., converts the power transmitted from the power receiving coil 1B, feeds the power to the battery 5, and charges the battery 5. That is, the vehicle-side electric circuit 2B has a function of a charger that charges the battery 5. The battery 5 is a battery in which a plurality of secondary batteries is connected, and is a power source for the vehicle including the vehicle-side unit 200. The BC 6 is a controller that manages the battery 5, and detects a state of charge (SOC: State of Charge) of the battery 5, the remaining volume of the battery 5, etc. The ECU 7 is a controller that collectively controls the power receiving coil 1B, the vehicle-side electric circuit 2B, and the BC 6. The ECU 7 controls the electric circuit 2B and manages the charge for the battery 5 in accordance with the state of the battery 5 managed by the BU 6. The vehicle-side communication device 8B makes communication with the ground-side communication device 8A, receives position information of the power transmitting coil 1A, information relating to the power transmitted from the power transmitting coil 1A, etc., and transmits the received information to the ECU 7.

Next, configurations of the BC 6 and the ECU 7 are described with reference to FIG. 2. FIG. 2 is a block diagram showing the configurations of the BC 6 and the ECU 7. The BC 6 includes a state-of-charge detection unit 601. The state-of-charge detection unit 601 detects SOC of the battery 5. Since the SOC is correlated with the voltage of the battery 5, the state-of-charge detection unit 601 may detect the SOC of the battery 5 by detecting the voltage of the battery 5. Information relating to the SOC of the battery 5 detected by the state-of-charge detection unit 601 is transmitted to the ECU 7.

The ECU 7 includes a charge-allowable-range setting unit 701, a judgment unit 702, a judgment-result notification unit 703, and a charge control unit 704. The charge-allowable-range setting unit 701 sets a charge allowable range in accordance with the SOC detected by the state-of-charge detection unit 601. The charge allowable range indicates a range of the position of the power transmitting coil 1A for allowing the charge for the battery 5 with respect to the position of the power receiving coil 1B. Since the power transmitting coil 1A is provided in the ground-side unit 100 and the power receiving coil 1B is provided in the vehicle-side unit 200, the position of the power transmitting coil 1A with respect to the power receiving coil 1B varies depending on the parked position of the vehicle. In this embodiment, the charge allowable range is set as described below, as a judgment criterion for the positional relationship between the coils for allowing the charge for the battery 5 when the vehicle is parked in the parking space.

The judgment unit 702 judges whether the charge for the battery 5 is allowed or not in accordance with the position of the power transmitting coil 1A with respect to the power receiving coil 1B. When the vehicle is parked, if the position of the power transmitting coil 1A is within the charge allowable range, the charge is allowed, and if the position of the power transmitting coil 1A is outside the charge allowable range, the charge is not allowed. The judgment-result notification unit 703 displays the judgment result of the judgment unit 702 through, for example, a navigation system (not shown) provided at an instrumental panel, or voice.

Regarding the charge for the battery 5, power suitable for the charge is previously determined in accordance with the SOC, and is decreased as the SOC becomes close to full charge. The BC 6 manages the SOC of the battery 5. The BC 6 requests power required for the charge to the charge control unit 704 based on a predetermined charge method. The charge control unit 704 controls the power output from the vehicle-side electric circuit 2B to the battery 5 when the battery 5 is charged in accordance with the power requested by the BC 6. The charge control unit 704 decreases output power of the vehicle-side electric circuit 2B and limits charge power of the battery 5 stepwise as the SOC of the battery 5 increases. To be more specific, under the charge control unit 704, the charge for the battery 5 by the charger of the vehicle-side electric circuit 2B is performed by, for example, a method in which the charge is started by charge with constant current and then is switched to charge with multi-stage constant current or charge with multi-stage constant voltage.

Figure 3B:
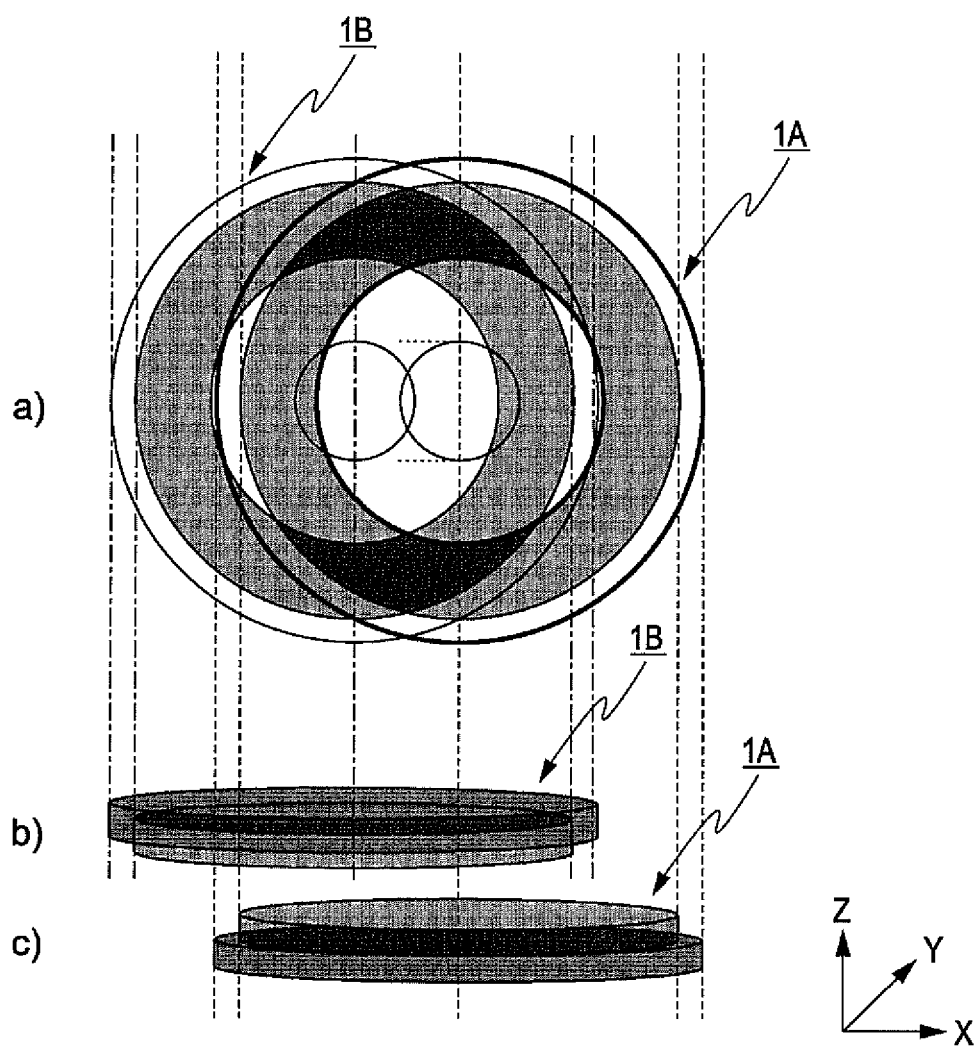
FIG. 3B provides a plan view and perspective views showing a state in which the power transmitting coil and the power receiving coil in FIG. 1 face each other and are shifted in the X-axis direction.
Figure 4:
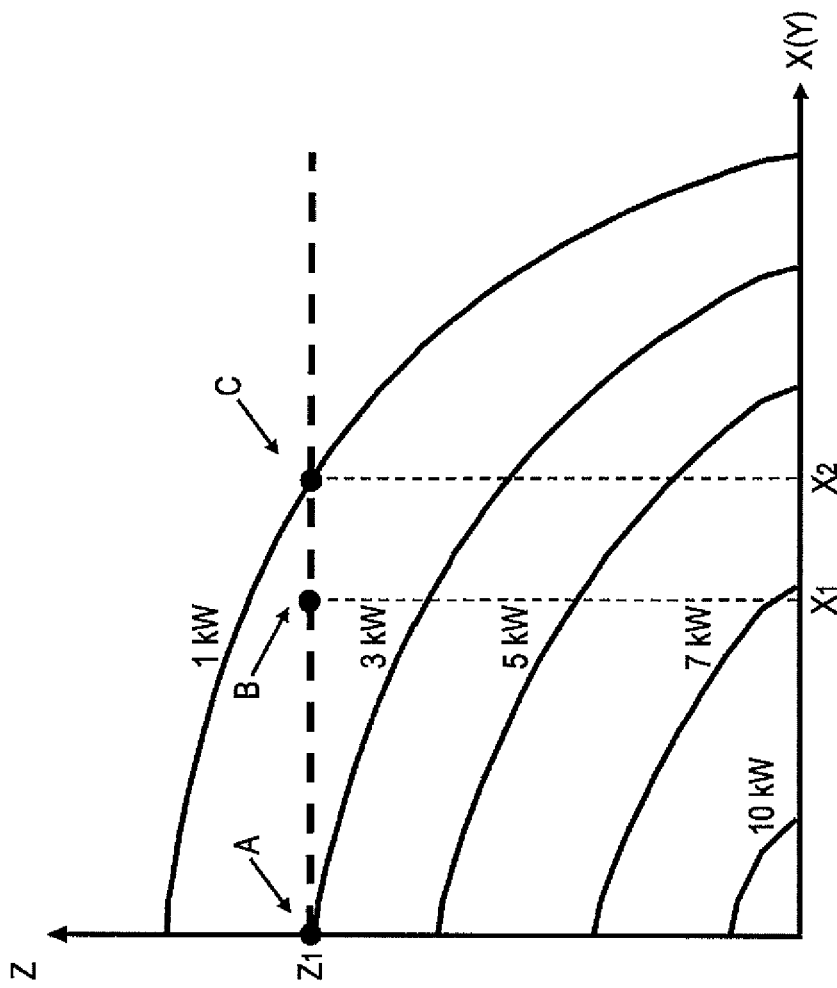
FIG. 4 shows properties of power that can be received by a power receiving coil 1B, in the X-axis direction (the Y-axis direction) and the Z-axis direction shown in FIGS. 3A and 3B.

Described next with reference to FIGS. 3 and 4 is that power received by the power receiving coil 1B varies depending on the positional relationship between the power transmitting coil 1A and the power receiving coil 1B. FIGS. 3A and 3B are a plan view a) and perspective views b) and c) showing a state in which the power transmitting coil 1A faces the power receiving coil 1B. In FIGS. 3A and 3B, the X-axis and the Y-axis indicate a plane direction and the Z-direction indicates a height direction of the power transmitting coil 1A and the power receiving coil 1B. For the description, it is assumed that the power transmitting coil 1A and the power receiving coil 1B both have the same circular shape. However, in this embodiment, the power transmitting coil 1A and the power receiving coil 1B do not have to have the circular shape or do not have to have the same shape.

When the power transmitting coil 1A is installed at the ground and the power receiving coil 1B is mounted on the vehicle, as shown in FIG. 3A, it is preferable that the vehicle is parked in the parking lot so that the power receiving coil 1B is aligned with the power transmitting coil 1A in the X-axis direction and the Y-axis direction that are the plane direction. However, as shown in FIG. 3B, the relative positions of the power transmitting coil 1A and the power receiving coil 1B may be shifted in the plane direction due to the ability of the driver. Also, the height of the vehicle varies depending on the type of vehicle and the amount of load. Hence, the distance between the power transmitting coil 1A and the power receiving coil 1B in the height direction Z varies due to the vehicle height.

When the power to be fed from the ground-side electric circuit 2A to the power transmitting coil 1A is made constant, efficiency of power received by the power receiving coil 1B becomes the highest if the power receiving coil 1B is aligned with the power transmitting coil 1A (corresponding to the state in FIG. 3A), and the efficiency of power is decreased if the center point of the power receiving coil 1B is far from the center point of the power transmitting coil 1A.

FIG. 4 shows properties of power that can be received by the power receiving coil 1B in the X-axis direction (the Y-axis direction) and the Z-axis direction shown in FIGS. 3A and 3B. It is assumed that the power to be fed from the ground-side electric circuit 2A to the power transmitting coil 1A is constant. As shown in FIG. 4, if the positions of the power transmitting coil 1A and the power receiving coil 1B are not changed and the distance between the power transmitting coil 1A and the power receiving coil 1B is increased in the Z-axis direction, the interval between the power transmitting coil 1A and the power receiving coil 1B is increased, and hence the reception power of the power receiving coil 1B is decreased.

The power receiving coil 1B is fixed to the vehicle. The distance between the power receiving coil 1B and the power transmitting coil 1A in the Z direction is not markedly changed with respect to the parking position of the vehicle, and is fixed at a distance (Z1) in the Z direction. When the distance in the Z direction is fixed at Z1, a dotted line in FIG. 4 indicates the maximum power to be received by the power receiving coil 1B. In the plane direction, if the center point of the power transmitting coil 1A is not shifted from the center point of the power receiving coil 1B and the power transmitting coil 1A directly faces the power receiving coil 1B (corresponding to FIG. 3A), the maximum power to be received by the power receiving coil 1B becomes 3.0 kW (point A in FIG. 4) When the center point of the power transmitting coil 1A is shifted from the center point of the power receiving coil 1B in the X direction (or the Y direction) and the distance between the power transmitting coil 1A and the power receiving coil 1B in the X direction becomes X1 (corresponding to FIG. 3B), the maximum power to be received by the power receiving coil 1B is decreased, and becomes 1.5 kW (point B in FIG. 4). Further, when the center point of the power transmitting coil 1A is shifted from the center point of the power receiving coil 1B in the X direction (or the Y direction) and the distance between the power transmitting coil 1A and the power receiving coil 1B in the X direction becomes X2, the power to be received by the power receiving coil 1B is further decreased, and becomes 1.0 kW (point C in FIG. 4).

Figure 5A:
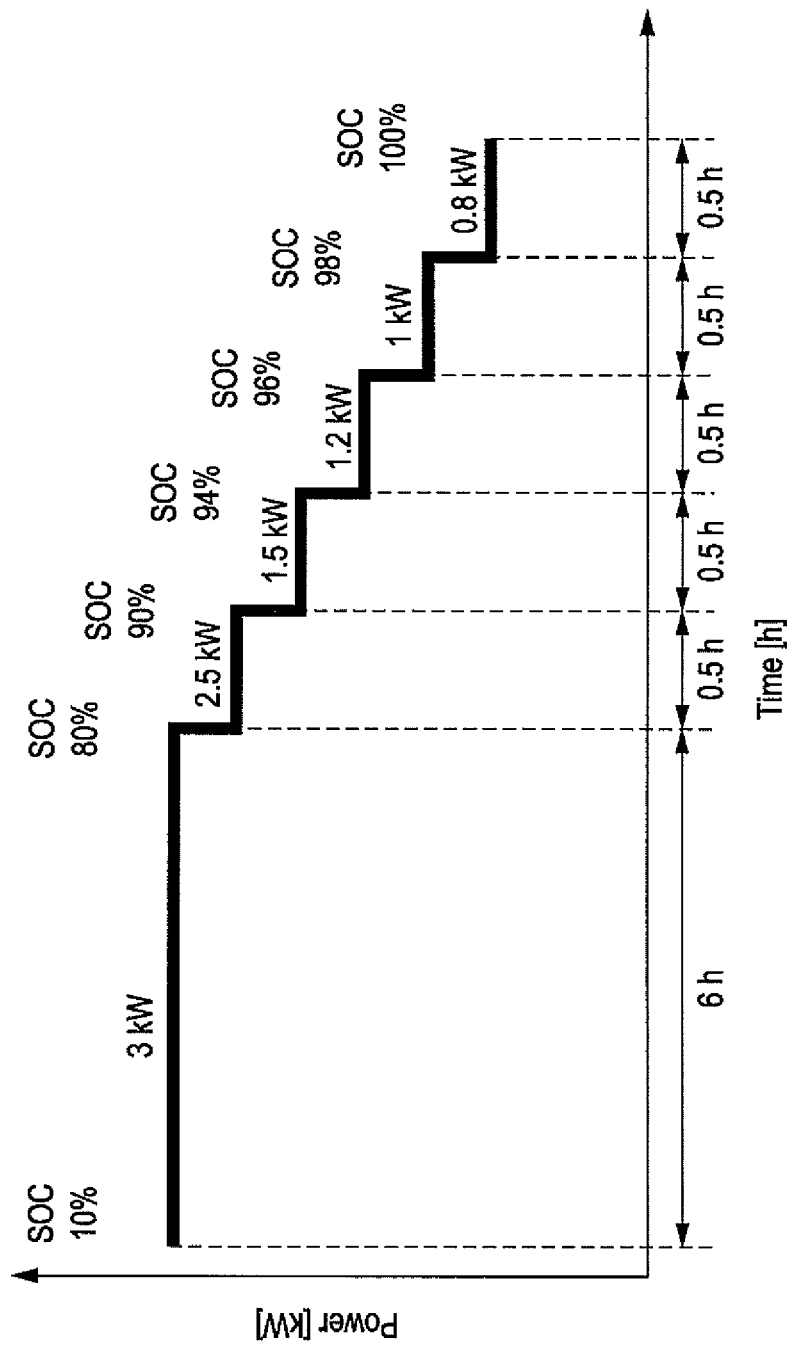
FIG. 5A is a graph showing properties of a charge power of a battery 5 with respect to a charge time in FIG. 1, and is a graph showing properties when the charge is performed in a state in which the reception power of the power receiving coil is 3.0 kW.
Figure 5B:
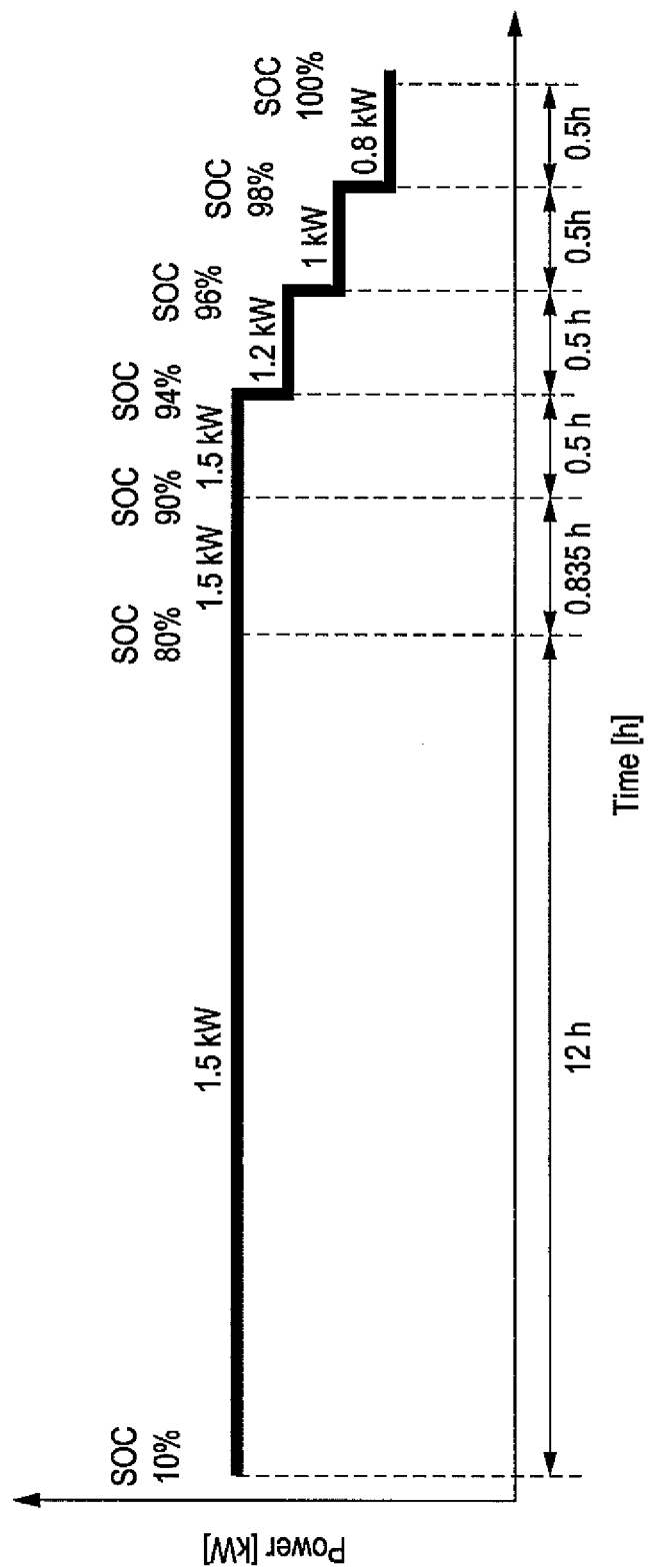
FIG. 5B is a graph showing properties of the charge power of the battery 5 with respect to the charge time in FIG. 1, and is a graph showing properties when the charge is performed in a state in which the reception power of the power receiving coil is 1.5 kW.

Next, the reception power of the power receiving coil 1B and the charge time of the battery 5 are described with reference to FIG. 5. FIGS. 5A and 5B are graphs showing properties of the charge power of the battery 5 with respect to the charge time. FIG. 5A shows properties when the charge is performed in the state in which the reception power of the power receiving coil 1B is 3.0 kW. FIG. 5B shows properties when the charge is performed in the state in which the reception power of the power receiving coil 1B is 1.5 kW. The charge is started when the SOC of the battery 5 is 10%, and the charge is ended when the SOC of the battery 5 becomes 100%. The properties of the charge in FIG. 5A indicate properties when the positional relationship between the coils is as shown in FIG. 3A and the charge is performed with the power at the point A in FIG. 4. The properties of the charge in FIG. 5B indicate properties when the positional relationship between the coils is as shown in FIG. 3B and the charge is performed with the power at the point B in FIG. 4.

The charge control unit 704 charges the battery 5 by setting the charge power of the battery 5 to 3.0 kW until the SOC of the battery 5 becomes 80%, decreasing the charge power of the battery 5 to 2.5 kW if the SOC of the battery 5 becomes 80%, decreasing the charge power of the battery 5 to 1.5 kW if the SOC of the battery 5 becomes 90%, decreasing the charge power of the battery 5 to 1.2 kW if the SOC of the battery 5 becomes 94%, decreasing the charge power of the battery 5 to 1.0 kW if the SOC of the battery 5 becomes 96%, and decreasing the charge power of the battery 5 to 0.8 kW if the SOC of the battery 5 becomes 98%.

As shown in FIG. 5A, if the charge is started from when the SOC is 10% in the state in which the maximum reception power of the power receiving coil 1B is 3.0 kW, the charge control unit 704 charges the battery 5 by feeding the maximum reception power (3.0 kW) of the power receiving coil 1B as the charge power, and decreases the charge power stepwise in accordance with the SOC under the above-described charge control. For the charge time, the time required for that the SOC is increased from 10% to 80% is 6 h, the time required for that the SOC is increased from 80% to 90% is 0.5 h, the time required for that the SOC is increased from 90% to 94% is 0.5 h, the time required for that the SOC is increased from 94% to 96% is 0.5 h, the time required for that the SOC is increased from 96% to 98% is 0.5 h, and the time required for that the SOC is increased from 98% to 100% is 0.5 h. Therefore, the charge time required for that the battery 5 is charged from when the SOC is 10% to the full charge is 8.5 h (=6+0.5+0.5+0.5+0.5+0.5).

In contrast, as shown in FIG. 5B, if the charge is started from when the SOC is 10% in the state in which the maximum reception power of the power receiving coil 1B is 1.5 kW, the charge control unit 704 charges the battery 5 by feeding the maximum reception power (1.5 kW) of the power receiving coil 1B as the charge power to the battery 5. As described above, the battery 5 according to this embodiment can be charged with the power equivalent to or higher than 1.5 kW until the SOC becomes 94%. However, in the state of the coil positions shown in FIG. 3B, since the maximum power to be received by the power receiving coil 1B is 1.5 kW, the charge is performed while the charge power is 1.5 kW until the SOC of the battery 5 becomes 94%, and decreases the charge power stepwise from when the SOC of the battery 5 reaches 94% in a manner similar to the above-described manner.

For the charge time, the time required for that the SOC is increased from 10% to 80% is 12 h, the time required for that the SOC is increased from 80% to 90% is 0.835 h, the time required for that the SOC is increased from 90% to 94% is 0.5 h, the time required for that the SOC is increased from 94% to 96% is 0.5 h, the time required for that the SOC is increased from 96% to 98% is 0.5 h, and the time required for that the SOC is increased from 98% to 100% is 0.5 h. Then, the charge time required for that the battery 5 is charged from when the SOC is 10% to the full charge is 14.835 h (=12+0.835+0.5+0.5+0.5+0.5).

That is, in the position state of the coils shown in FIG. 3B, as compared with the position state of the coils shown in FIG. 3A, the maximum power to be received by the power receiving coil 1B is low, and hence the charge time for the charge from when the SOC is 10% to the full charge is long.

Figure 6A:
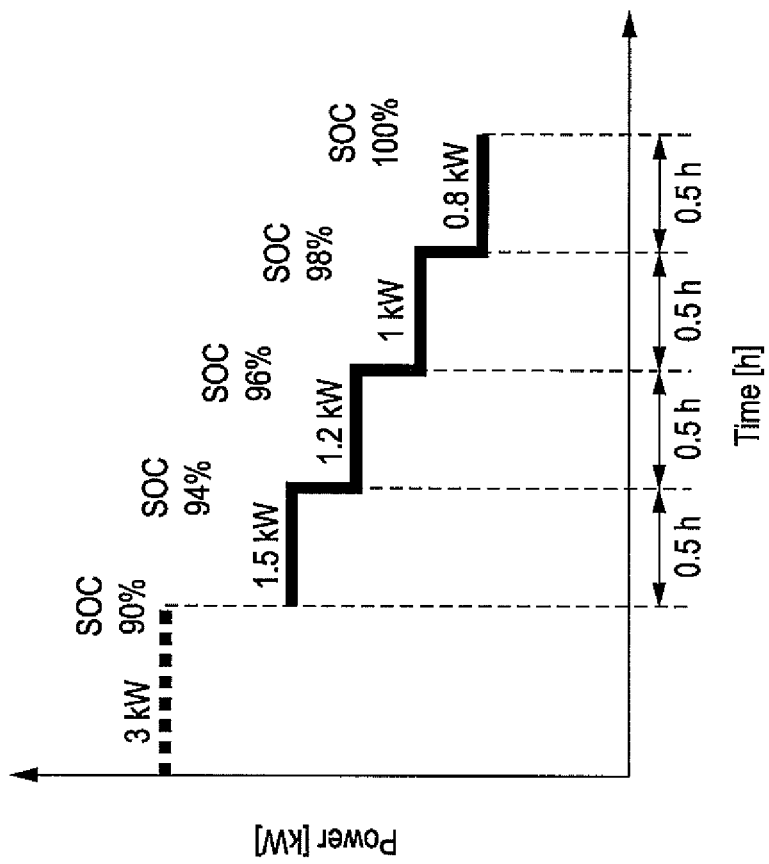
FIG. 6A is a graph showing properties of the charge power of the battery 5 with respect to the charge time in FIG. 1, and is a graph showing properties when the charge is performed in the state in which the reception power of the power receiving coil is 3.0 kW.
Figure 6B:
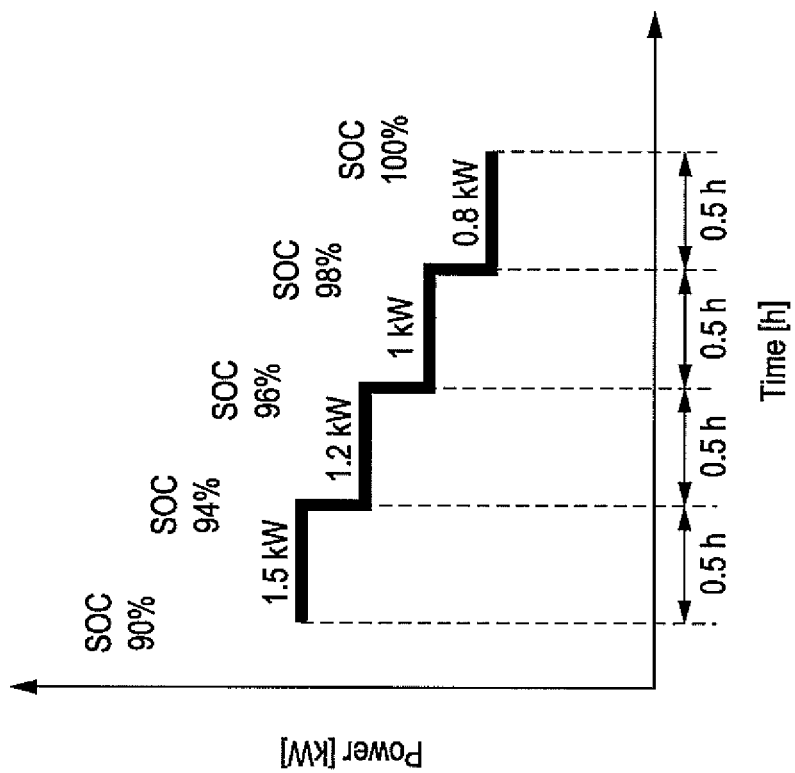
FIG. 6B is a graph showing properties of the charge power of the battery 5 with respect to the charge time in FIG. 1, and is a graph showing properties when the charge is performed in the state in which the reception power of the power receiving coil is 1.5 kW.

Next, the reception power of the power receiving coil 1B and the charge time of the battery 5 are described with reference to FIG. 6. FIG. 6 differs from FIG. 5 in that the charge is started when the SOC is 90%. FIGS. 6A and 6B are graphs showing properties of the charge power of the battery 5 with respect to the charge time. FIG. 6A shows properties when the charge is performed in the state in which the reception power of the power receiving coil 1B is 3.0 kW. FIG. 6B shows properties when the charge is performed in the state in which the reception power of the power receiving coil 1B is 1.5 kW. The properties of the charge in FIG. 6A indicate properties when the positional relationship between the coils is as shown in FIG. 3A and the charge is performed with the power at the point A in FIG. 4. The properties of the charge in FIG. 6B indicate properties when the positional relationship between the coils is as shown in FIG. 3B and the charge is performed with the power at the point B in FIG. 4.

In the example shown in FIG. 6, the charge is performed from when the SOC of the battery 5 is 90%. Hence, the charge control unit 704 charges the battery 5 by setting the charge power of the battery 5 to 1.5 kW until the SOC of the battery 5 becomes 94%, decreasing the charge power of the battery 5 to 1.2 kW if the SOC of the battery 5 becomes 94%, decreasing the charge power of the battery 5 to 1.0 kW if the SOC of the battery 5 becomes 96%, decreasing the charge power of the battery 5 to 0.8 kW if the SOC of the battery 5 becomes 98%.

As shown in FIG. 6A, if the charge is started from when the SOC is 90% in the state in which the maximum reception power of the power receiving coil 1B is 3.0 kW, the charge control unit 704 charges the battery 5 by decreasing the maximum reception power (3.0 kW) of the power receiving coil 1B to the charge power (1.5 kW) and feeding the charge power, and decreases the charge power stepwise in accordance with the SOC under the above-described charge control. For the charge time, the time required for that the SOC is increased from 90% to 94% is 0.5 h, the time required for that the SOC is increased from 94% to 96% is 0.5 h, the time required for that the SOC is increased from 96% to 98% is 0.5 h, and the time required for that the SOC is increased from 98% to 100% is 0.5 h. Therefore, the charge time required for that the battery 5 is charged from when the SOC is 90% to the full charge is 2.0 h (=0.5+0.5+0.5+0.5).

In contrast, as shown in FIG. 6B, if the charge is started from when the SOC is 90% in the state in which the maximum reception power of the power receiving coil 1B is 1.5 kW, the charge control unit 704 charges the battery 5 by feeding the maximum reception power (1.5 kW) of the power receiving coil 1B as the charge power, and decreases the charge power stepwise in accordance with the SOC under the above-described charge control. For the charge time, the time required for that the SOC is increased from 90% to 94% is 0.5 h, the time required for that the SOC is increased from 94% to 96% is 0.5 h, the time required for that the SOC is increased from 96% to 98% is 0.5 h, and the time required for that the SOC is increased from 98% to 100% is 0.5 h. Therefore, the charge time required for that the battery 5 is charged from when the SOC is 90% to the full charge is 2.0 h (=0.5+0.5+0.5+0.5).

In the position state of the coils shown in FIG. 3B, as compared with the position state of the coils shown in FIG. 3A, the maximum power to be received by the power receiving coil 1B is decreased. However, since the maximum reception power of the power receiving coil 1B is equal to or higher than the maximum charge power when the charge for the battery 5 is started, even if the positional shift of the coil occurs as shown in FIG. 3B, the charge time is not changed.

That is, if the SOC is close to the full charge, as shown in FIGS. 5 and 6, the power required for the charge may be low. Hence, as the SOC is close to the full state, the positional shift of the coil may be allowed.

Next, the control contend of the non-contact charging system according to this embodiment is described with reference to FIGS. 2 and 7. FIG. 7 is a schematic illustration for explaining the charge allowable range, and corresponds to the plan view of the power receiving coil 1B.

The non-contact charging system according to this embodiment is operated when the vehicle is parked in the parking space including the ground-side unit 100. First, the state-of-charge detection unit 601 detects the SOC of the battery 5, and transmits information relating to the detected SOC to the ECU 7. Then, the charge-allowable-range setting unit 701 sets the charge allowable range as follows in accordance with the SOC of the battery 5. The charge-allowable-range setting unit 701 sets the charge allowable range along the principal plane direction of the power transmitting coil 1A or the power receiving coil 1B. The charge allowable range is an imaginary circular range around the power receiving coil 1B serving as the center, and is a range for judging that the charge is allowed if the power transmitting coil 1A is within the charge allowable range. Also, the charge allowable range is set so that the charge is completed within a previously expected charge time. As shown in FIG. 5B, if a positional shift between the power transmitting coil 1A and the power receiving coil 1B is large, the battery 5 can be charged as long as the power receiving coil 1B can receive the power. However, if the battery 5 is charged from when the SOC is low to the full charge, the charge time may be long. Owing to this, the charge allowable range sets an allowable positional shift of the coil in a region in the horizontal direction (a direction parallel to the parking space) in accordance with the SOC of the battery 5 so that the charge is ended within a previously expected time.

To be more specific, as shown in FIG. 7, the charge-allowable-range setting unit 701 sets an area (a) as the charge allowable range if the SOC of the battery 5 is 0% or higher and lower than 80%, sets an area (b) as the charge allowable range if the SOC of the battery 5 is 80% or higher and lower than 90%, and sets the area (c) as the charge allowable range if the SOC of the battery 5 is 90% or higher. That is, the charge-allowable-range setting unit 701 sets the charge allowable range to be larger as the SOC is higher. Hence, the allowable positional shift of the coil is larger as the SOC is higher.

When the charge-allowable-range setting unit 701 sets the charge allowable range, the ECU 7 uses a navigation device and a parking assistance system with an on-vehicle camera (not shown), so that the charge allowable range is displayed on a display of the navigation device. The driver of the vehicle aligns the parking position while viewing the display so that the position of the power transmitting coil 1A is within the charge allowable range. Accordingly, the driver can park the vehicle at a position suitable for the charge.

Then, after the parking, the ECU 7 detects the position of the power transmitting coil 1A through the communication devices 8A and 8B. In this embodiment, the position of the power transmitting coil 1A is detected through communication made by the ground-side communication device 8A and the vehicle-side communication device 8B. However, the position of the power transmitting coil 1A may be detected by providing, for example, a position sensor at the power transmitting coil 1A or the power receiving coil 1B. Alternatively, an antenna for signal transmission may be provided at the ground-side unit 100, a receiver may be provided at the vehicle-side unit 200, and the position of the coil may be detected from a communication state of a signal transmitted from the antenna.

When the position of the power transmitting coil 1A is detected through the communication devices 8A and 8B, the judgment unit 702 judges whether the position of the power transmitting coil is within the charge allowable range or not. Then, if the position of the power transmitting coil is within the charge allowable range, the judgment unit 702 judges that the battery 5 can be charged. If the judgment unit 702 judges that the charge is allowed, the charge control unit 704 controls the reception power of the power receiving coil 1B to be the charge power suitable for the charge for the battery 5 in accordance with the SOC detected by the state-of-charge detection unit 601, and feeds the charge power to the battery 5. That is, if the reception power of the power receiving coil 1B is higher than the charge power suitable for the charge, the charge control unit 704 decreases the reception power and feeds the charge power suitable for the charge to the battery 5. In contrast, if the reception power of the power receiving coil 1B is lower than the charge power suitable for the charge, the charge control unit 704 feeds the reception power of the power receiving coil 1B as the charge power to the battery 5. If the judgment unit 702 judges that the charge is not allowed, the judgment-result notification unit 703 may make notification about the judgment result and notify the driver about promotion of re-parking.

The state-of-charge detection unit 601 detects the SOC even during the charge for the battery 5, and the charge control unit 704 decreases the charge power stepwise as the SOC is increased. Then, when the battery 5 is fully charged, the charge control unit 704 ends the power feed to the battery 5. Accordingly, in the non-contact charging system in the embodiment, the battery 5 is charged.

Figure 8:
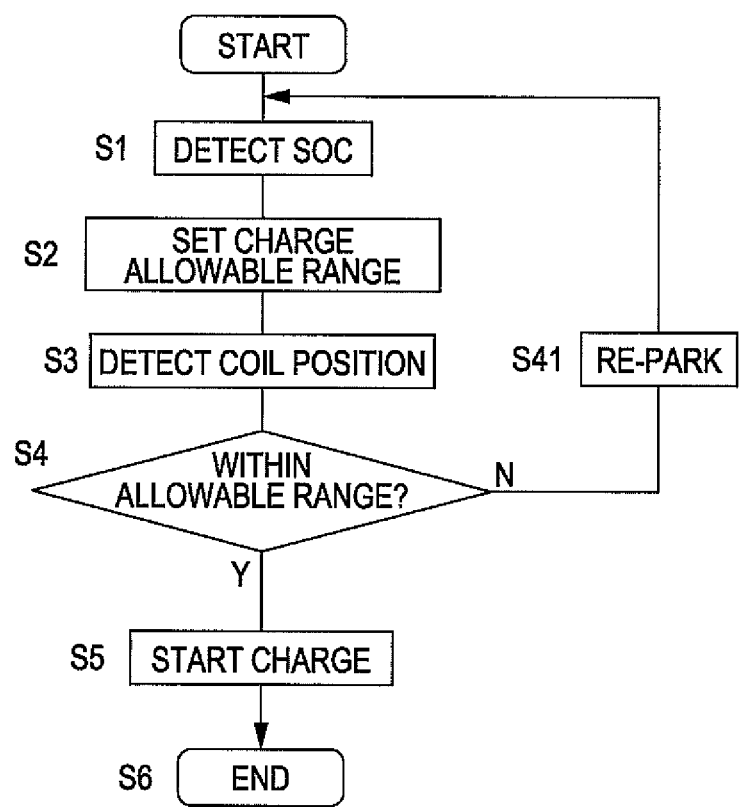
FIG. 8 is a flowchart showing a control procedure of the non-contact charging system in FIG. 1.

Next, a control procedure of the non-contact charging system according to this embodiment is described with reference to FIG. 8. FIG. 8 is a flowchart showing a control procedure of the non-contact charging system according to this embodiment. When the control by the non-contact charging system according to this embodiment is started, in step S1, the state-of-charge detection unit 601 detects the SOC of the battery 5, and transmits information of the detected SOC to the ECU 7. In step S2, the charge-allowable-range setting unit 701 sets the charge allowable range in accordance with the detected SOC. In step S3, the ECU 7 detects the position of the transmitting coil 1A through the ground-side communication device 8A and the vehicle-side communication device 8B. In the non-contact charging system according to this embodiment, for example, when the vehicle approaches the parking space or when the vehicle starts to be parked in the parking space, the ground-side communication device 8A may start to make communication with the vehicle-side communication device 8B and the position of the transmitting coil 1A may be detected.

In step S4, the judgment unit 702 judges whether the position of the power transmitting coil 1A is within the charge allowable range or not. If the position of the power transmitting coil 1A is not within the charge allowable range, the judgment unit 702 does not allow the charge. In step S41, the judgment-result notification unit 703 notifies an occupant about the judgment result indicative of that the charge is not allowed by providing displaying for promoting the occupant to perform re-parking, and then the processing returns to step S1. If the position of the power transmitting coil 1A is within the charge allowable range, the judgment unit 702 allows the charge and the processing goes to step S5.

In step S5, the charge control unit 704 starts the charge for the battery by setting the charge power in accordance with the SOC of the battery 5 and the reception power of the power receiving coil 1B, and feeding the charge power to the battery 5. Also, the judgment-result notification unit 703 notifies the occupant about the judgment result for allowing the charge by notifying the occupant about the start of the charge. Then, when the SOC of the battery 5 becomes the full charge, the control by the non-contact charging system according to this embodiment is ended.

As described above, the non-contact charging device according to this embodiment includes the power receiving coil 1B, the vehicle-side electric circuit 2B, the battery 5, the state-of-charge detection unit 601, and the charge-allowable-range setting unit 701, and sets the charge allowable range, which indicates the range of the position of the power transmitting coil 1A for allowing the charge for the battery, with respect to the position of the power receiving coil 1B, in accordance with the SOC. The positional shift between the power receiving coil 1B and the power transmitting coil 1A allowable for charging the battery 5 varies depending on the SOC of the battery 5. In this embodiment, since the charge allowable range is set in accordance with the SOC, the range for allowing the positional shift can be determined. If the positional shift of the coil is outside the charge allowable range, the driver may park the vehicle so that the positional shift of the coil is within the charge allowable range, and hence convenience for the user can be increased. Also, in this embodiment, for example, if the parking assistance system in the navigation device is used to display the charge allowable range on the display of the navigation device, when the driver parks the vehicle while viewing the charge allowable range, the position of the power receiving coil 1B can be aligned with respect to the power transmission coil 1A, within the range for allowing the charge for the battery 5. As the result, the non-contact charging device according to this embodiment can increase the convenience for the user.

Also, in this embodiment, the charge-allowable-range setting unit 701 sets the charge allowable range to be larger as the SOC is higher. The charge power suitable for charging the battery 5 with the high SOC is lower than the charge power of the battery 5 with the low SOC. Owing to this, if the SOC is high, the reception power of the power receiving coil 1B may be low, and the range for allowing the positional shift of the coil is increased. In this embodiment, since the charge allowable range is set to be larger as the SOC is higher, the range of the positional shift of the coil for allowing the charge can be set in accordance with the SOC, and as the result, the convenience for the user can be increased.

Also, in this embodiment, the communication devices 8A and 8B that detect the position of the power transmitting coil, the judgment unit 702, and the judgment-result notification unit 703 that makes notification about the judgment result of the judgment unit 702 are included, and if the position of the power transmitting coil is within the charge allowable range, the judgment unit 702 judges that the battery 5 is allowed to be charged. Accordingly, the occupant views the judgment result notified by the judgment-result notification unit 703, and hence the occupant can recognize whether the charge is available or not in the current parking state. Also, if the vehicle is parked in a state not suitable for the charge because the positional shift of the coil is large, the occupant can recognize the state through the notification of the judgment-result notification unit 703. As the result, this embodiment can increase the convenience for the user. Also, if the vehicle is parked in the state not suitable for the charge because the positional shift of the coil is large, the power received by the power receiving coil 1B is low and hence the battery 5 may not be charged to the full charge or the charge time for charging the battery 5 to the full charge may be long. In this embodiment, if the vehicle is in the state not suitable for the charge because the positional shift of the coil is large, the occupant can recognize the state not suitable for the charge through the notification by the judgment-result notification unit 703. Accordingly, the occupant can re-park the vehicle so that the state becomes suitable for the charge. As the result, the charge time can be decreased.

In this embodiment, the charge allowable range is circular; however, the charge allowable range does not have to be circular and may be rectangular. Also, in this embodiment, the charge allowable range is a two-dimensional plane; however, the charge allowable range may be a three-dimensional region.

Also, in this embodiment, since the charge allowable range is set to be larger as the SOC is higher, as shown in FIG. 7, a plurality of charge allowable ranges are set while the SOC (80%) and the SOC (90%) serve as boundaries. However, the boundaries do not have to be the SOC (80%) and the SOC (90%), and the charge allowable range may be continuously changed in accordance with the SOC.

Also, in this embodiment, the control portion of the vehicle-side system is divided into the BC 6 and the ECU 7. However, the BC 6 and the ECU 7 may be a single controller.

Also, the charge allowable range is previously set so that the charge is ended within the previously expected charge time. However, the size of the charge allowable range may be set in accordance with the charge time requested by the occupant. For example, if the driver parks the vehicle and has a time until the next drive, the charge time may be long. Also, if the charge time may be long, as shown in FIGS. 5 and 6, the reception power of the power receiving coil 1B may be low, and hence the charge allowable range may be large. That is, the occupant sets a desirable charge time. The charge-allowable-range setting unit 701 sets the charge allowable range to be large if the charge time is long, and sets the charge allowable range to be small if the charge time is short. Accordingly, in this embodiment, the range for allowing the positional shift of the coil can be set in accordance with the charge time requested by the occupant and the SOC, and hence the convenience for the user can be increased.

In this embodiment, the vehicle-side electric circuit 2B may include a temperature detection circuit such as a thermistor and may detect the temperature of the battery 5, and the charge-allowable-range setting unit 701 may set the charge allowable range in accordance with the detection temperature of the battery 5. Also, the vehicle-side electric circuit 2B may include a temperature detection circuit such as a thermistor and may detect the temperature of the inside of the vehicle, and the charge-allowable-range setting unit 701 may set the charge allowable range in accordance with the detection temperature of the inside of the vehicle. Accordingly, the allowance for the charge can be properly judged in accordance with the temperature of the battery 5 or the in-vehicle temperature, and hence the convenience for the user can be increased.

The power receiving coil 1B and the vehicle-side electric circuit 2B correspond to a "power receiving device" according to the present invention, the state-of-charge detection unit 601 corresponds to "state-of-charge detection means," the charge-allowable-range setting unit 701 corresponds to "charge-allowable-range setting means, the judgment unit 702 corresponds to "judgment means," the judgment-result notification unit 703 corresponds to "judgment-result notification means," the ground-side communication device 8A and the vehicle-side communication device 8B correspond to "position detection means," the charge control unit 704 corresponds to "charge control means," and the temperature detection circuit included in the vehicle-side electric circuit 2B corresponds to "temperature detection means."

Figure 9:
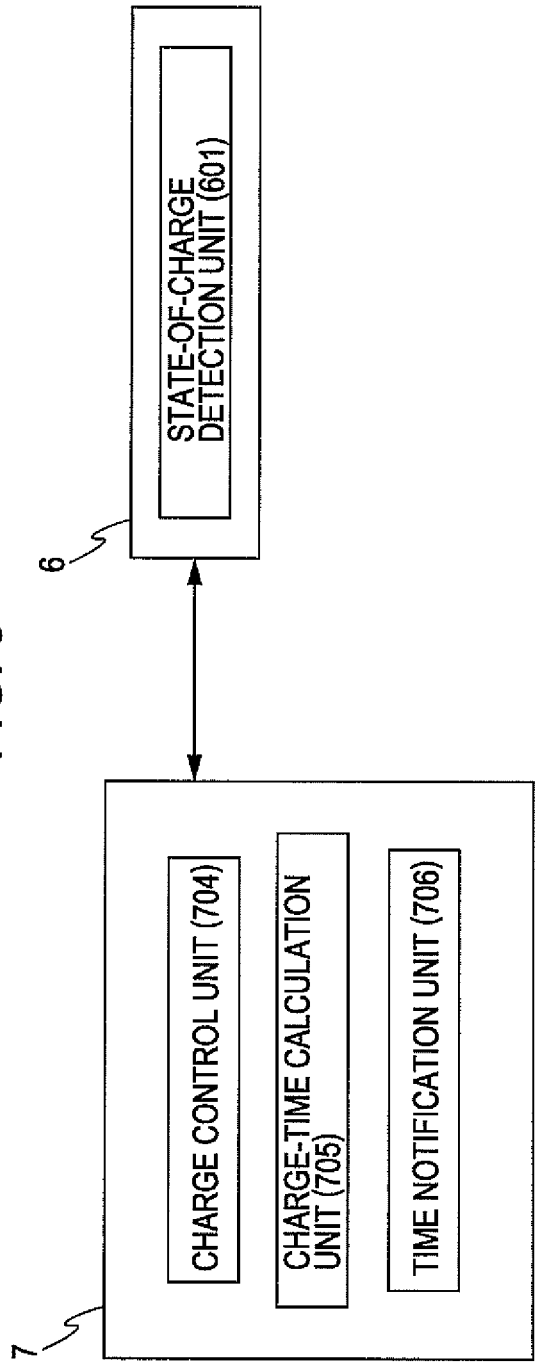
FIG. 9 is a block diagram of a battery controller and an electronic control unit of a non-contact charging system according to another embodiment of the present invention.

FIG. 9 is a block diagram showing a non-contact charging system according to another embodiment of the present invention. This embodiment differs from the above-described first embodiment in that a charge-time calculation unit 705 and a time notification unit 706 are provided. The configuration other than these units is similar to that of the first embodiment, and the description is occasionally incorporated.

As shown in FIG. 9, the ECU 7 includes the charge control unit 704, the charge-time calculation unit 705, and the time notification unit 706. The charge-time calculation unit 705 calculates a charge time (T1) for charging the battery 5 in accordance with the SOC detected by the state-of-charge detection unit 601 and the position of the power transmitting coil with respect to the position of the power receiving coil 1B. As shown in FIG. 4, the reception power of the power receiving coil 1B varies depending on the degree of the positional shift of the power receiving coil 1B with respect to the power transmitting coil 1A. Hence, if the degree of the positional shift of the power receiving coil 1B with respect to the power transmitting coil 1A is detected, the reception power of the power receiving coil 1B is obtained. As shown in FIGS. 5 and 6, if the reception power of the power receiving coil 1B and the current SOC of the battery 5 are obtained, the charge time of the battery 5 is calculated.

In this embodiment, first, when the vehicle is parked in the predetermined parking space, the ECU 7 detects the position of the power transmitting coil 1A through the ground-side communication device 8A and the vehicle-side communication device 8B. The state-of-charge detection unit 601 detects the SOC of the battery 5. The charge-time calculation unit 705 calculates the degree of the positional shift of the coil based on the position of the power transmitting coil 1A with respect to the power receiving coil 1B. Then, the charge-time calculation unit 705 calculates the reception power of the power receiving coil 1B based on the degree of the positional shift of the coil. For the reception power of the power receiving coil 1B, the ECU 7 stores a map as shown in FIG. 4, and calculates the reception power of the power receiving coil 1B by referencing the map for the detected position of the power transmitting coil 1A.

In the ground-side unit 100, if the output power from the power transmitting coil 1A to the power receiving coil 1B is fixed, the charge-time calculation unit 705 may calculate the reception power of the power receiving coil 1B by calculating the percentage of the power to be received by the power receiving coil 1B from among the previously fixed output power, in accordance with the degree of the positional shift of the coil. In contrast, in the ground-side unit 100, if the output power from the power transmitting coil 1A to the power receiving coil 1B varies, the ECU 7 detects the output power of the power transmitting coil 1A set by the ECU 3, through the communication devices 8A and 8B. Then, the charge-time calculation unit 705 may calculate the reception power of the power receiving coil 1B by calculating the percentage of the power to be received by the power receiving coil 1B from among the detected output power, in accordance with the degree of the positional shift of the coil.

Next, the charge control unit 704 sets the charge power of the battery 5 from the charge power requested based on the BC 6 and the reception power of the power receiving coil 1B. The charge-time calculation unit 705 calculates the charge time (T1) from the current SOC to the full charge under the charge method of the charge control unit 704 from the charge power set by the charge control unit 704 and the SOC. For example, if SOC as a target after the charge is set through a request of a user, the charge control unit 704 calculates a charge time (T1) from the current SOC to the target SOC.

Accordingly, the charge-time calculation unit 705 calculates the charge time (T1) from the detected position of the power transmitting coil 1A and the SOC. The calculated charge time (T1) is increased as the positional shift of the power transmitting coil 1A with respect to the position of the power receiving coil 1B is larger. As the SOC is decreased, the charge time is increased.

Also, the charge-time calculation unit 705 calculates a charge time (T2) based on the SOC if the power receiving coil 1B is arranged at a position corresponding to the position of the power transmitting coil 1A. The position of the power receiving coil 1B corresponding to the position of the power transmitting coil 1A is the position at which the center of the power transmitting coil 1A is aligned with the center of the power receiving coil 1B in the plane direction of the power transmitting coil 1A and the power receiving coil 1B. In this state, the power reception efficiency between the power transmitting coil 1A and the power receiving coil 1B is the highest, and corresponds to an ideal parking state of the vehicle. Also, the ideal parking state of the vehicle is a state in which the power transmitting coil 1A directly faces the power receiving coil 1B, and the charge time is the shortest. Hence, under the condition with the same SOC, the charge time (T1) when the positional shift of the coil occurs is longer than the charge time (T2).

If the power receiving coil 1B is arranged at the position corresponding to the position of the power transmitting coil 1A (in the ideal parking state of the vehicle), a power loss when power is transmitted from the power transmitting coil 1A to the power receiving coil 1B is previously determined. Hence, if the output power from the power transmitting coil 1A to the power receiving coil 1B is fixed, the reception power of the power receiving coil 1B in the ideal parking state of the vehicle is previously determined. Accordingly, the charge-time calculation unit 705 can calculate the charge time (T2) by using the current SOC without use of position information of the power transmitting coil 1A.

In the ground-side unit 100, if the output power from the power transmitting coil 1A to the power receiving coil 1B varies, the ECU 7 detects the output power of the power transmitting coil 1A set by the ECU 3, through the communication devices 8A and 8B. The ECU 7 calculates the reception power of the power receiving coil 1B by subtracting the power loss during the power transmission in the ideal parking state of the vehicle from the output power. The charge control unit 704 sets the charge power of the battery 5 from the charge power requested from the BC 6 and the reception power of the power receiving coil 1B. Then, the charge-time calculation unit 705 can calculate the charge time (T2) by using the charge power and the current SOC.

When the charge-time calculation unit 705 calculates the charge time (T1) and the charge time (T2), the ECU 7 calculates a time difference (ΔT) between the charge time (T1) and the charge time (T2), and compares the time difference with a previously set time difference (ΔTc). The time difference (ΔTc) represents a time difference with respect to an allowable charge time with respect to the charge time (T2). That is, if the positional shift of the coil occurs with respect to the position of the coil corresponding to the charge time (T2), the charge time (T1) is longer than the charge time (T2), and the charge time (T1) is increased as the positional shift of the coil is larger. Hence, the time difference (ΔTc) corresponds to the allowable degree of positional shift of the coil. The time difference (ΔTc) may be set to correspond to the previously expected charge time, or may be set in accordance with the charge time requested by the occupant. As the charge time requested by the occupant is longer, the time difference (ΔTc) is increased.

Then, if the time difference (ΔT) is larger than the time difference (ΔTc), the ECU 7 determines that the positional shift of the coil occurs by a degree that the charge cannot be completed within the allowable charge time, and causes the time notification unit 706 to notify the occupant about the charge time (T1). The occupant recognizes the charge time (T1), and if the occupant determines that the battery 5 may be charged for the charge time (T1), the occupant operates a charge start button or the like (not shown) to start the charge. In contrast, if the occupant determines not to charge the battery 5 for the charge time (T1), the driver re-parks the vehicle so that the positional shift of the coil is decreased.

If the time difference (ΔT) is larger than the time difference (ΔTc), the ECU 7 determines that the positional shift of the coil is by a degree that the charge can be completed within the allowable charge time, and the ECU 7 controls the charge control unit 704 to start the charge for the battery 5.

Hence, in this embodiment, the charge time (T1) is calculated in accordance with the position of the power transmitting coil 1A and the SOC, makes notification about the charge time (T1) in accordance with the comparison result between the charge time (T1) and the charge time (T2), and charges the battery 5.

Figure 10:
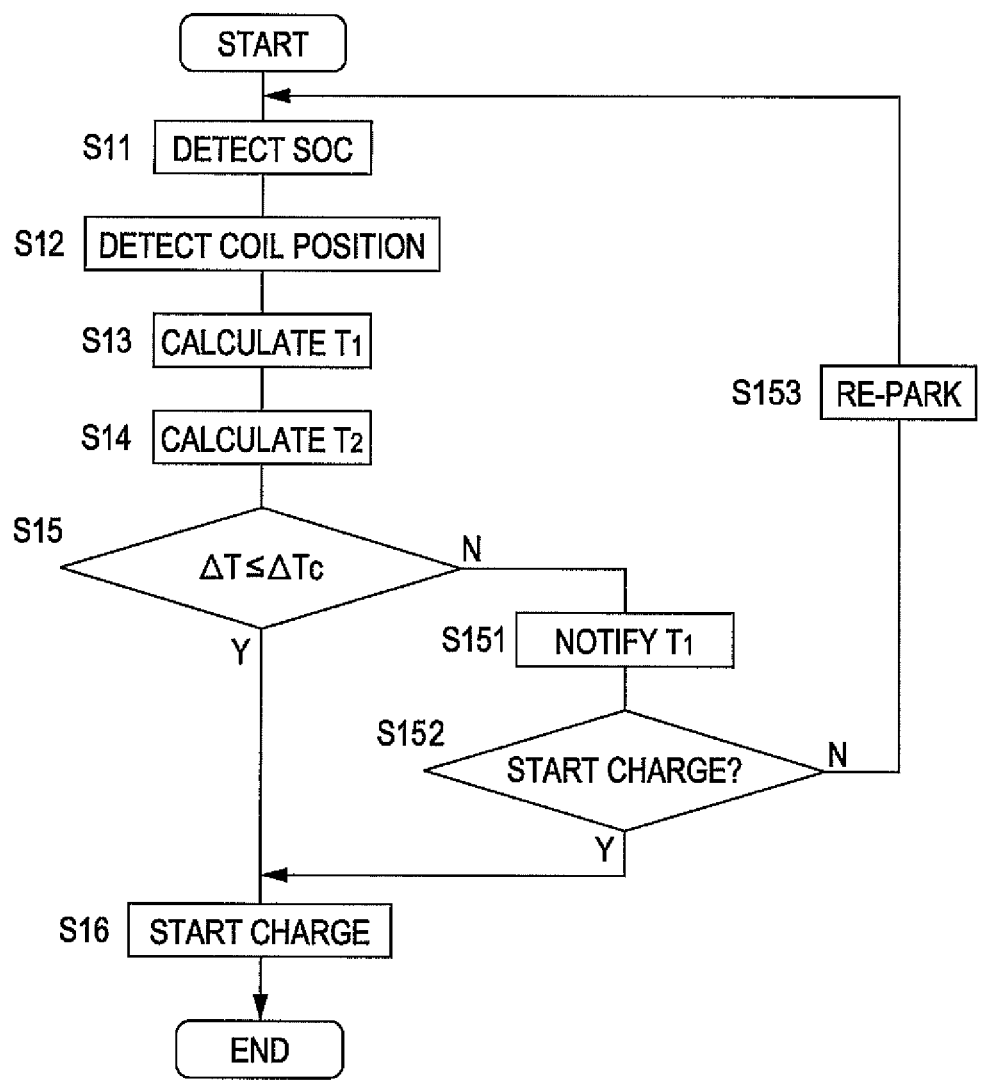
FIG. 10 is a flowchart showing a control procedure of the non-contact charging system in FIG. 9.

Next, a control procedure of the non-contact charging system according to this embodiment is described with reference to FIG. 10. FIG. 10 is a flowchart showing a control procedure of the non-contact charging system according to this embodiment. When the control by the non-contact charging system according to this embodiment is started, in step S11, the state-of-charge detection unit 601 detects the SOC of the battery 5, and transmits information of the detected SOC to the ECU 7. In step S12, the ECU 7 detects the position of the transmitting coil 1A through the ground-side communication device 8A and the vehicle-side communication device 8B. In step S13, the charge-time calculation unit 705 calculates the charge time (T1) in accordance with the detected position of the power transmitting coil 1A and the SOC. In step S14, the charge-time calculation unit 705 calculates the charge time (T2) in accordance with the SOC.

In step S15, the ECU 7 calculates the time difference (ΔT) between the charge time (T1) and the charge time (T2), and compares the time difference (ΔT) with the previously set time (ΔTc). If the time difference (ΔT) is equal to or smaller than the time (ΔTc), the ECU 7 determines that the charge can be completed within the previously set allowable time. The charge control unit 704 starts the charge for the battery 5 by setting the charge power in accordance with the SOC of the battery 5 and the reception power of the power receiving coil 1B, and feeding the charge power to the battery 5 (step S16).

In contrast, if the time difference (ΔT) is larger than the time difference (ΔTc), the ECU 7 determines that the charge cannot be completed within the previously set allowable time. The time notification unit 706 notifies the occupant about the charge time (T1) by displaying the charge time (T1) on the display or the like of the navigation device (step S151). In step S152, the occupant determines whether the charge for the charge time (T1) is performed or not. If the occupant determines that the charge for the battery 5 may take the charge time (T1), operates the charge start button (not shown) or the like, and hence starts the charge, the processing goes to step S16. If the occupant determines that the charge for the charge time (T1) is not performed, the driver re-parks the vehicle in step S153, and the processing returns to step S11. For example, assuming that the time difference (ΔTc) is one hour, if the charge time (T1) is nine hours and the charge time (T2) is seven hours, and if the occupant thinks that the charge may be completed within ten hours, the vehicle does not have to be re-parked in the ideal parking state, and this embodiment starts the charge for the charge time (T1). In contrast, if the occupant wants to complete the charge within eight hours, since the charge cannot be completed within the desirable time of the occupant with the positional relationship between the coils for the charge time (T1), the vehicle is re-parked.

Then, when the SOC of the battery 5 becomes the full charge, the control by the non-contact charging system according to this embodiment is ended.

As described above, the non-contact charging device according to this embodiment includes the power receiving coil 1B, the vehicle-side electric circuit 2B, the battery 5, the state-of-charge detection unit 601, the communication devices 8A and 8B, and the charge-time calculation unit 705. The charge time (T1) of the battery 5 is calculated in accordance with the detected position of the power transmitting coil 1A and the SOC. The charge time (T1) of the battery 5 varies depending on the positional shift between the power receiving coil 1B and the power transmitting coil 1A, and the SOC. In this embodiment, since the charge time (T1) can be calculated in accordance with the position of the power transmitting coil 1A and the SOC, for example, when the charge time (T1) is notified to the occupant, the occupant can recognize the charge time (T1) corresponding to the positional shift of the coil. Also, if the notified charge time (T1) is long, the occupant can recognize that the positional shift of the coil is large. By re-parking the vehicle and decreasing the positional shift of the coil, the charge time can be decreased. If the occupant has a sufficient time for the charge time, even if the positional shift of the coil is large and the charge time (T1) is long, the occupant can charge the battery 5. Hence, the driver can save the troublesome work of re-parking the vehicle and aligning the position of the coil. As the result, this embodiment can increase the convenience for the user.

Also, for example, if an allowable charge time (Ts) is set, the allowable degree of the positional shift of the coil can be determined by the charge time. Hence, by comparing the charge time (T1) with the charge time (Ts), it can be recognized whether the charge can be completed or not within the charge time (Ts). To be more specific, the charge is allowed if the charge time (T1) is shorter than the charge time (Ts), and the charge is not allowed if the charge time (T1) is longer than the charge time (Ts). Then, based on the judgment result, the driver may park the vehicle so that the positional relationship between the coils to be allowed in accordance with the SOC is maintained. This embodiment can increase the convenience for the user. Also, if the charge time (T1) with regard to the positional shift of the coil is over the allowable charge time (Ts), by re-parking the vehicle and decreasing the positional shift of the coil, the total charge time can be decreased. The allowable charge time (Ts) may be a time that is set by the occupant.

Also, in this embodiment, the charge time (T2) of the battery 5 if the power receiving coil 1B is arranged at the position corresponding to the position of the power transmitting coil 1A is calculated. In this embodiment, since the charge time (T1) and the charge time (T2) are calculated, the degree of the positional shift of the coil for the center points of the power transmitting coil 1A and the power receiving coil 1B can be determined by the charge time.

Also, in this embodiment, if the time difference (ΔT) between the charge time (T1) and the charge time (T2) is larger than the time difference (ΔTc), the time notification unit 706 makes notification about at least the charge time (T1). Accordingly, a situation in which the charge cannot be completed within the allowable time because the positional shift of the coil is large can be transmitted to the user. Also, the user can perform the charge for the charge time (T1) if the user has a sufficient time, and the user can perform the charge for a time shorter than the charge time (T1), for example, by re-parking the vehicle and changing the coil position if the user does not have a sufficient time. As the result, this embodiment can decrease the total charge time while increasing the convenience for the user.

In step S151, the time notification unit 706 makes notification about the charge time (T1) if the time difference (ΔT) is larger than the time difference (ΔTc). In addition, the charge time (T2) may be also notified. The time notification unit 706 may make notification about at least the charge time (T1). If the time notification unit 706 makes the notification about the charge time (T1) and the charge time (T2), the occupant can recognize the charge time (T1) in the current parking state and the charge time (T2) in the ideal parking state. The occupant can select the start of the charge or the re-parking of the vehicle as required. Hence, this embodiment can increase the convenience for the user.

The charge-time calculation unit 705 corresponds to "charge-time calculation means," and the time notification unit 706 corresponds to "charge-time notification means."

Third Embodiment

Figure 11:
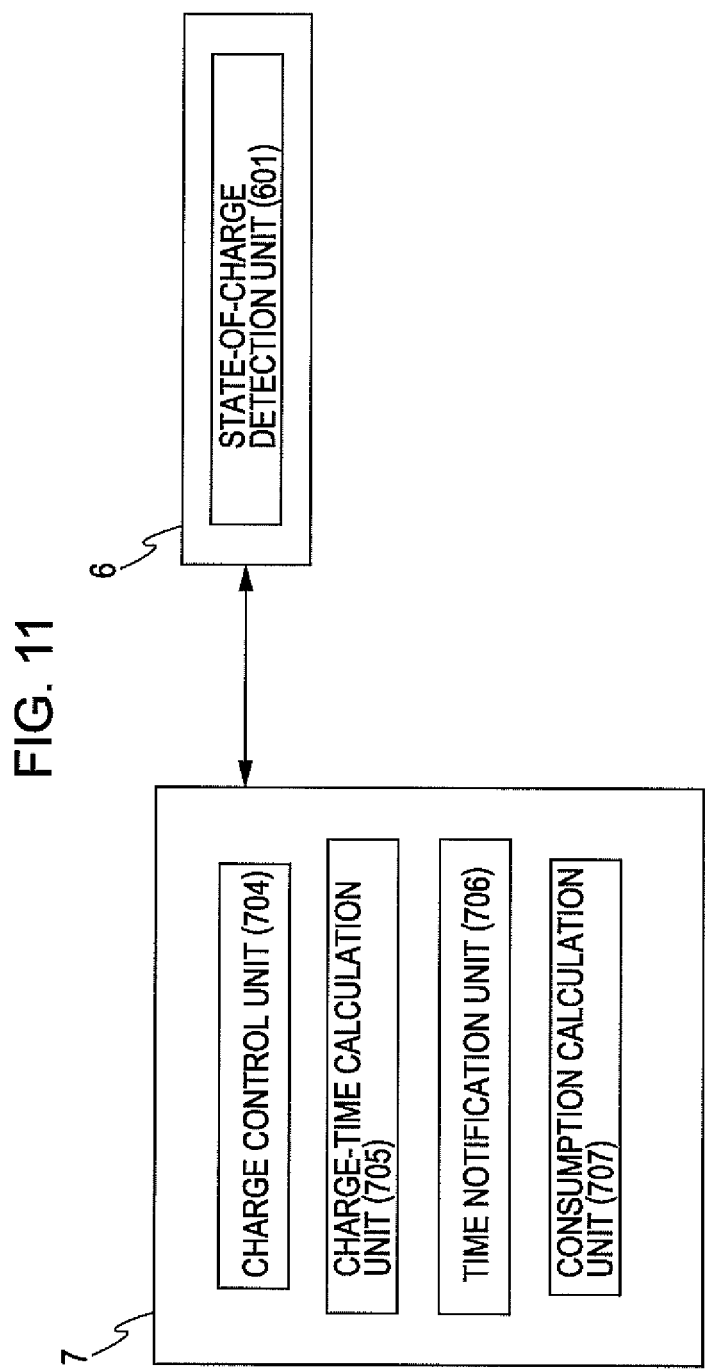
FIG. 11 is a block diagram of a battery controller and an electronic control unit of a non-contact charging system according to still another embodiment of the present invention.

FIG. 11 is a block diagram showing a non-contact charging system according to still another embodiment of the present invention. This embodiment differs from the above-described second embodiment in that a consumption calculation unit 707 is provided. The configuration other than the unit is similar to that of the second embodiment, and the description is occasionally incorporated.

As shown in FIG. 11, the ECU 7 includes the charge control unit 704, the charge-time calculation unit 705, the time notification unit 706, and the consumption calculation unit 707. The consumption calculation unit 707 calculates a consumption of the battery 5 to be consumed when the vehicle including the vehicle-side unit 200 is moved.

In the non-contact charging system according to the second embodiment, in step S153 of FIG. 10, the driver re-parks the vehicle and aligns the positions of the power transmitting coil 1A and the power receiving coil 1B with each other. When the vehicle is re-parked, the power charged in the battery 5 is consumed. Owing to this, the charge time when the vehicle is re-parked and the battery 5 is charged in the ideal parking state is a time obtained by adding a charge time for charging a volume corresponding to the consumption by the re-parking, to the charge time (T2).

In this embodiment, the consumption calculation unit 707 calculates a consumption of the battery 5 to be consumed by moving the power receiving coil 1B to the position corresponding to the position of the power transmitting coil 1A by the re-parking. That is, the consumption calculation unit 707 calculates the amount of power to be consumed by the battery 5 by parking the vehicle from the current parking state to the ideal parking state. Then, the charge-time calculation unit 705 calculates a charge time (T3) for the charge for the consumption. In other words, the charge-time calculation unit 705 converts the consumption of the battery 5 into the charge time. When the vehicle is parked and the positional shift of the coil occurs, the charge time for charging the battery 5 to the full charge is the charge time (T1) calculated by the charge-time calculation unit 705. Also, when the vehicle is re-parked from the parking state with the positional shift of the coil occurring to the ideal parking state, a charge time (T4) for charging the battery 5 to the full charge is calculated such that the charge-time calculation unit 705 adds the charge time (T3) to the charge time (T2).

The charge-time calculation unit 705 calculates the charge time (T4) before the vehicle is re-parked. That is, a travel locus when the vehicle is re-parked from the parking state with the positional shift of the coil occurring to the ideal parking state is calculated by using an optimal-path calculation system or the like used by navigation or obstacle-avoidance control or the like. Hence, the state-of-charge detection unit 601 detects the current SOC and then the consumption calculation means 707 can calculate the consumption of the battery 5 based on the SOC and the travel locus before the re-parking.

Then, the ECU 7 compares the charge time (T1) with the charge time (T4). If the charge time (T1) is longer than the charge time (T4), the charge time is decreased as long as the driver re-parks the vehicle to the ideal parking state. Hence, if the charge time (T1) is longer than the charge time (T4), the ECU 7 controls the time notification unit 706 to make notification about the charge time (T1) and the charge time (T4) and to promote the occupant to determine whether the charge is started or the vehicle is re-parked. In contrast, if the charge time (T1) is shorter than the charge time (T4), the charge time is increased as long as the driver re-parks the vehicle. The charge time can be decreased as long as the charge is performed in the current parking state. Hence, if the charge time (T1) is shorter than the charge time (T4), the ECU 7 causes the charge control unit 704 to start the charge for the battery 5.

As described above, in this embodiment, the charge time (T1) in the current parking state and the charge time (T4) in the ideal state with regard to the consumption of the battery 5 by the re-parking are calculated, and the battery 5 is charged in accordance with the comparison result between the charge time (T1) and the charge time (T4).

Figure 12:
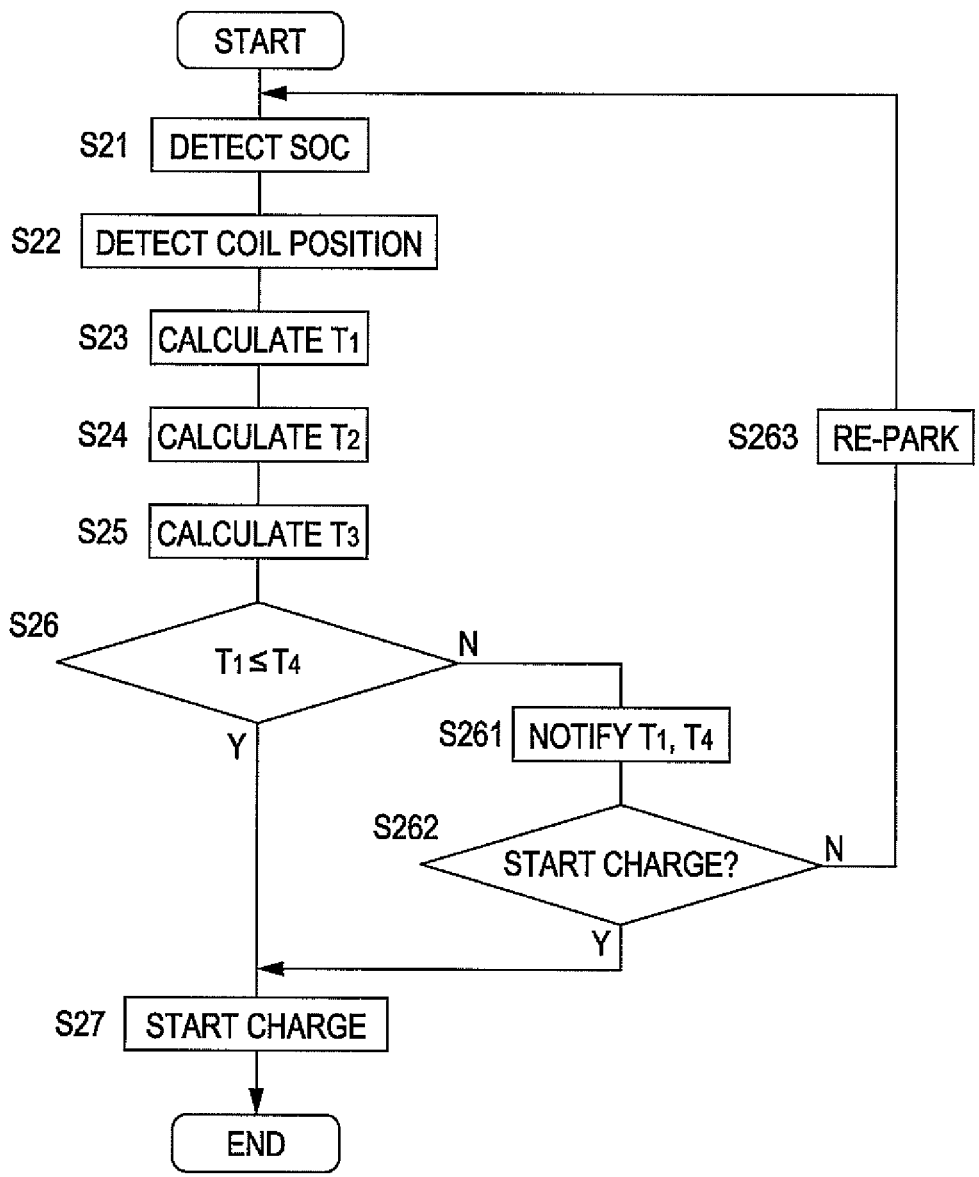
FIG. 12 is a flowchart showing a control procedure of the non-contact charging system in FIG. 11.

Next, a control procedure of the non-contact charging system according to this embodiment is described with reference to FIG. 12. FIG. 12 is a flowchart showing a control procedure of the non-contact charging system according to this embodiment. When the control by the non-contact charging system according to this embodiment is started, control processing from step S21 to step S24 is performed. The control processing from step S21 to step S24 is similar to the control processing from step S11 to step S14 according to the second embodiment, and hence the description is omitted. After step S24, the consumption calculation unit 707 calculates the consumption of the battery 5 to be consumed when the vehicle is re-parked and the power receiving coil 1B is moved to the position corresponding to the power transmitting coil 1A. Then, the charge-time calculation unit 705 calculates the charge time (T3) for charging the volume corresponding to the consumption (step S25). In step S26, the ECU 7 causes the charge-time calculation unit 705 to calculate the charge time (T4) by adding the charge time (T3) to the charge time (T2) and to compare the charge time (T1) with the charge time (T4).

If the charge time (T1) is equal to or shorter than the charge time (T4), the charge time can be decreased as long as the charge is performed in the current parking state rather than that the vehicle is re-parked. Hence, the ECU 7 causes the charge control unit 704 to start the charge for the battery 5 by setting the charge power in accordance with the SOC of the battery 5 and the reception power of the power receiving coil 1B and feeding the charge power to the battery 5 (step S27).

In contrast, if the charge time (T1) is longer than the charge time (T4), the charge time can be decreased as long as the vehicle is re-parked in the ideal parking state. In step S261, the time notification unit 706 notifies the occupant about the charge time (T1) and the charge time (T4) by displaying the charge time (T1) and the charge time (T4) on the display or the like of the navigation device. In step S262, the occupant determines whether the charge for the charge time (T1) is performed or not. If the occupant determines that the charge for the battery 5 may take the charge time (T1), operates the charge start button (not shown) or the like, and hence starts the charge, the processing goes to step S27. If the occupant determines that the charge should be performed for the charge time (T4) which is shorter than the charge time (T1), the driver re-parks the vehicle in step S263, and the processing returns to step S21.

Then, when the SOC of the battery 5 becomes the full charge, the control by the non-contact charging system according to this embodiment is ended.

As described above, in the non-contact charging device according to this embodiment, the consumption calculation unit 707 calculates the consumption of the battery 5 to be consumed when the vehicle including the vehicle-side unit 200 is re-parked and the power receiving coil 1B is moved to the position corresponding to the power transmitting coil 1A, and then calculates the charge time (T3) for charging the volume corresponding to the consumption. Accordingly, the charge time when the re-parking is performed can be calculated with regard to the consumption of the battery 5 to be consumed when the vehicle is re-parked in the ideal parking state. Also, in this embodiment, since the charge time is decreased through the comparison between the charge time (T1) and the charge time (T4), it is recognized whether the vehicle should be re-parked or not, and the total charge time can be decreased.

Also, in this embodiment, the charge-time calculation unit 705 calculates the charge time (T4) by adding the charge time (T3) to the charge time (T2), and if the charge time (T4) is shorter than the charge time (T1), the time notification unit 706 makes the notification about the charge time (T1) and the charge time (T4). Accordingly, in this embodiment, the user can recognize that the charge time is decreased if the user re-parks the vehicle. Also, the user can determine whether the vehicle is re-parked or not depending on the desirable charge time of the user. As the result, this embodiment can increase the convenience for the user.

Also, in this embodiment, if the charge time (T4) is longer than the charge time (T1), the charge is started at the position of the power transmitting coil 1A with respect to the power receiving coil 1B when the positional shift of the coil occurs.

Accordingly, if the charge time is shorter in the current parking state rather than that the vehicle is re-parked, the charge can be started without the re-parking. The convenience for the user can be increased.

Also, in this embodiment, if the vehicle is re-parked, the output of a driving motor (not shown) of the vehicle may be limited to suppress the battery consumption by the re-parking as much as possible. Accordingly, a battery consumption time can be easily estimated. Further, if the re-parking is automated, the estimation becomes easier.

The consumption calculation unit 707 corresponds to "consumption calculation means" according to the present invention.

Fourth Embodiment

Figure 13:
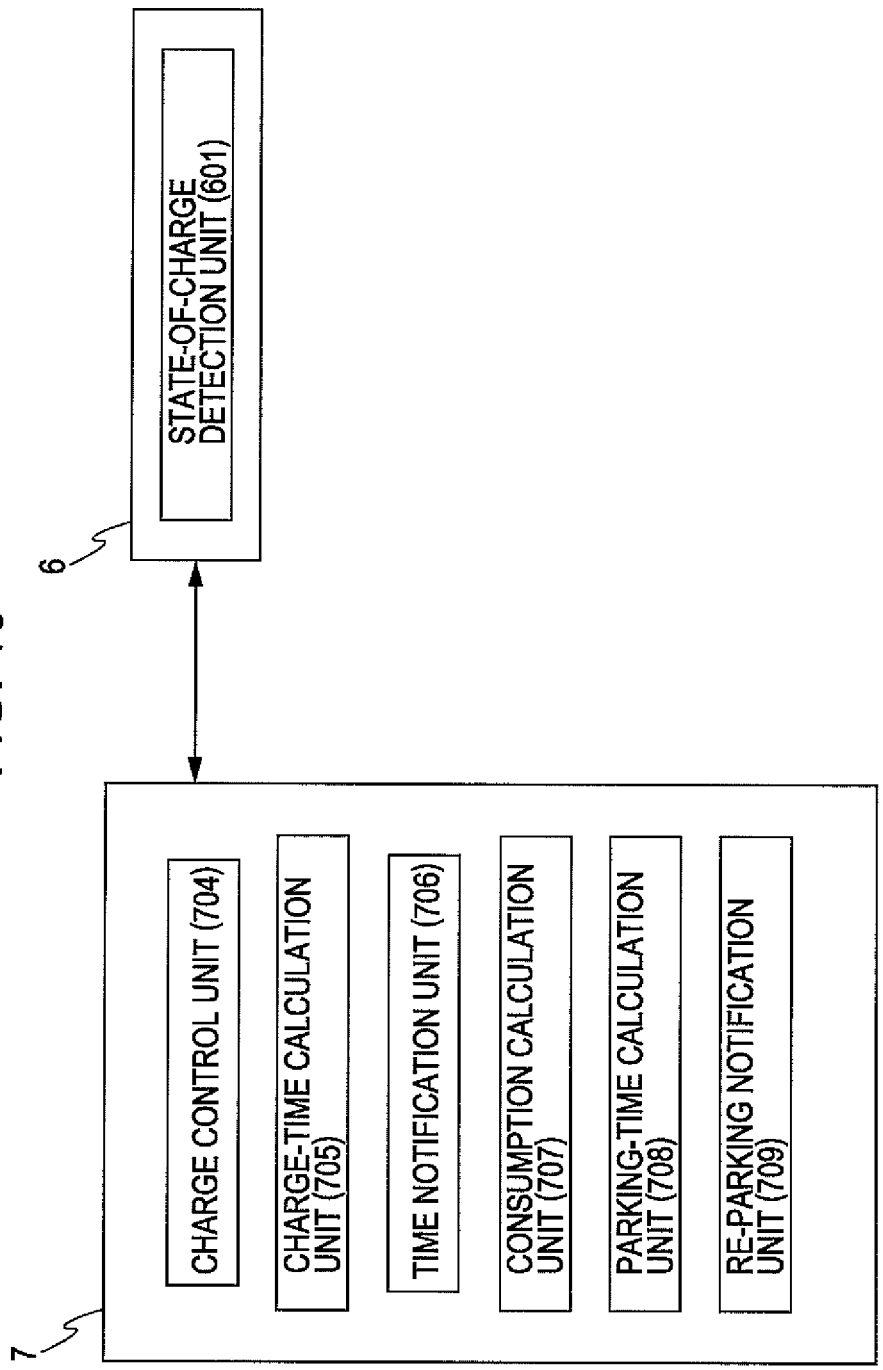
FIG. 13 is a block diagram of a battery controller and an electronic control unit of a non-contact charging system according to yet another embodiment of the present invention.

FIG. 13 is a block diagram showing a non-contact charging system according to yet another embodiment of the present invention. This embodiment differs from the above-described second embodiment in that the consumption-time calculation unit 707, a parking-time calculation unit 708, and a re-parking notification unit 709 are provided. The configuration other than the configuration described above is similar to that of the second embodiment, and the description of the second and third embodiments is occasionally incorporated.

As shown in FIG. 13, the ECU 7 includes the charge control unit 704, the charge-time calculation unit 705, the time notification unit 706, the consumption calculation unit 707, the parking-time calculation unit 708, and the re-parking notification means 709. The parking-time calculation unit 708 calculates a parking time (Tp) for parking the vehicle including the vehicle-side unit 200 from the current parking state to the ideal parking state. The re-parking notification means 709 makes notification for promoting the occupant to perform the re-parking under a predetermined condition. The notification is made through, for example, displaying on a display unit or the like of the navigation device. If the driver re-parks the vehicle and aligns the position of the power transmitting coil 1A with the position of the power receiving coil 1B, the re-parking and the alignment take the parking time (Tp) for moving the vehicle. Based on the state with the positional shift of the coil occurring, the charge time for re-parking the vehicle in the ideal state and performing the charge to the full charge may take into account the parking time (Tp).

Owing to this, in this embodiment, the parking-time calculation unit 708 calculates the parking time (Tp), and the charge-time calculation unit 705 adds the charge time (T3) and the parking time (Tp) to the charge time (T2) and thus calculates a charge time (T5). When the vehicle is parked and the positional shift of the coil occurs, the charge time for charging the battery 5 to the full charge is the charge time (T1) calculated by the charge-time calculation unit 705. Also, when the vehicle is re-parked from the parking state with the positional shift of the coil occurring to the ideal parking state, the charge time (T5) for charging the battery 5 to the full charge is calculated such that the charge-time calculation unit 705 adds the charge time (T3) and the parking time (Tp) to the charge time (T2).

The parking-time calculation unit 708 calculates the parking time (Tp) before the vehicle is re-parked. That is, a travel locus when the vehicle is re-parked from the parking state with the positional shift of the coil occurring to the ideal parking state is calculated by using an optimal-path calculation system or the like used by navigation or obstacle-avoidance control or the like. Hence, the parking-time calculation unit 708 can calculate the parking time (Tp) before the re-parking based on the travel locus and a previously set average speed when the vehicle is parked.

Then, the ECU 7 compares the charge time (T1) with the charge time (T5). If the charge time (T1) is longer than the charge time (T5), the charge time is decreased if the driver re-parks the vehicle to the ideal parking state. Hence, if the charge time (T1) is longer than the charge time (T5), the ECU 7 causes the time notification unit 706 to make notification about the charge time (T1) and the charge time (T5), and causes the re-parking notification means 709 to make notification about the re-parking.

As described above, in this embodiment, the charge time (T1) in the current parking state and the charge time (T5) in the ideal state with regard to the consumption of the battery 5 by the re-parking and the parking time (Tp) are calculated, and the battery 5 is charged in accordance with the comparison result between the charge time (T1) and the charge time (T5).

Figure 14:
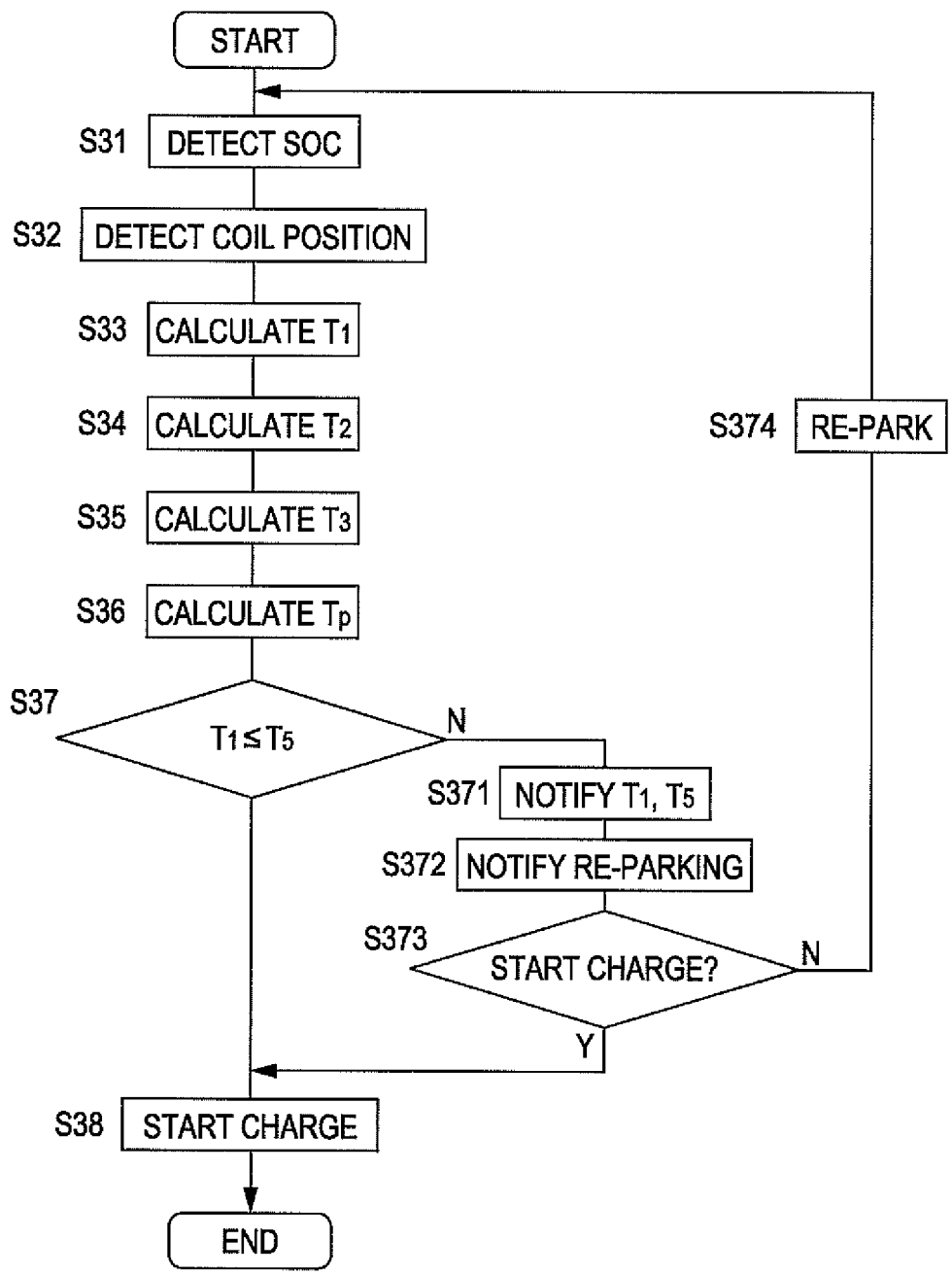
FIG. 14 is a flowchart showing a control procedure of the non-contact charging system in FIG. 13.

Next, a control procedure of the non-contact charging system according to this embodiment is described with reference to FIG. 14. FIG. 14 is a flowchart showing a control procedure of the non-contact charging system according to this embodiment. When the control by the non-contact charging system according to this embodiment is started, control processing from step S31 to step S35 is performed. The control processing from step S31 to step S35 is similar to the control processing from step S21 to step S25 according to the third embodiment, and hence the description is omitted. After step S35, the parking-time calculation unit 708 calculates the parking time (Tp) for re-parking the vehicle to move the power receiving coil 1B to the position corresponding to the power transmitting coil 1A (step S36). In step S37, the ECU 7 causes the charge-time calculation unit 705 to calculate the charge time (T5) by adding the charge time (T3) and the parking time (Tp) to the charge time (T2) and to compare the charge time (T1) with the charge time (T5).

If the charge time (T1) is equal to or shorter than the charge time (T5), the charge time can be decreased as long as the charge is performed in the current parking state rather than that the vehicle is re-parked. Hence, the ECU 7 causes the charge control unit 704 to start the charge for the battery 5 by setting the charge power in accordance with the SOC of the battery 5 and the reception power of the power receiving coil 1B and feeding the charge power to the battery 5 (step S38).

In contrast, if the charge time (T1) is longer than the charge time (T5), the charge time can be decreased as long as the vehicle is re-parked in the ideal parking state. In step S371, the time notification unit 706 notifies the occupant about the charge time (T1) and the charge time (T5) by displaying the charge time (T1) and the charge time (T5) on the display or the like of the navigation device. Also, in step S372, the re-parking notification means 709 makes notification for promoting the re-parking.

In step S373, the occupant determines whether the charge for the charge time (T1) is performed or not. If the occupant determines that the charge for the battery 5 may take the charge time (T1), operates the charge start button (not shown) or the like, and hence starts the charge, the processing goes to step S38. If the occupant determines that the charge should be performed for the charge time (T5) which is shorter than the charge time (T1), the driver re-parks the vehicle in step S374, and the processing returns to step S31.

Then, when the SOC of the battery 5 becomes the full charge, the control by the non-contact charging system according to this embodiment is ended.

As described above, in the non-contact charging device according to this embodiment, the parking-time calculation unit 708 calculates the parking time (Tp) for re-parking the vehicle including the vehicle-side unit 200 to move the power receiving coil 1B to the position corresponding to the power transmitting coil 1A. Accordingly, the charge time when the re-parking is performed can be calculated by taking into account the parking time when the vehicle is re-parked in the ideal parking state. Also, in this embodiment, since the charge time is decreased through the comparison between the charge time (T1) and the charge time (T5), it is recognized whether the vehicle should be re-parked or not, and the total charge time can be decreased.

Also, in this embodiment, the charge-time calculation unit 705 calculates the charge time (T5) by adding the charge time (T3) and the parking time (Tp) to the charge time (T2), and if the charge time (T5) is shorter than the charge time (T1), the time notification unit 706 makes the notification about the charge time (T1) and the charge time (T5). Accordingly, in this embodiment, the user can recognize that the charge time is decreased if the user re-parks the vehicle. Also, the user can determine whether the vehicle is re-parked or not depending on the desirable charge time of the user. As the result, this embodiment can increase the convenience for the user.

Also, in this embodiment, if the charge time (T5) is shorter than the charge time (T1), the re-parking notification unit 709 makes notification for promoting the re-parking. Accordingly, in this embodiment, the user can recognize that the charge time is decreased if the user re-parks the vehicle. Also, the user can determine whether the vehicle is re-parked or not depending on the desirable charge time of the user. As the result, this embodiment can increase the convenience for the user.

Also, in this embodiment, if the charge time (T5) is longer than the charge time (T1), the charge is started at the position of the power transmitting coil 1A with respect to the power receiving coil 1B when the positional shift of the coil occurs. Accordingly, if the charge time is shorter in the current parking state rather than that the vehicle is re-parked, the charge can be started without the re-parking. The convenience for the user can be increased.

The parking-time calculation unit 708 corresponds to "parking-time calculation means" according to the present invention and the re-parking notification unit 709 corresponds to "re-parking notification means" according to the present invention.

Fifth Embodiment

Figure 15:
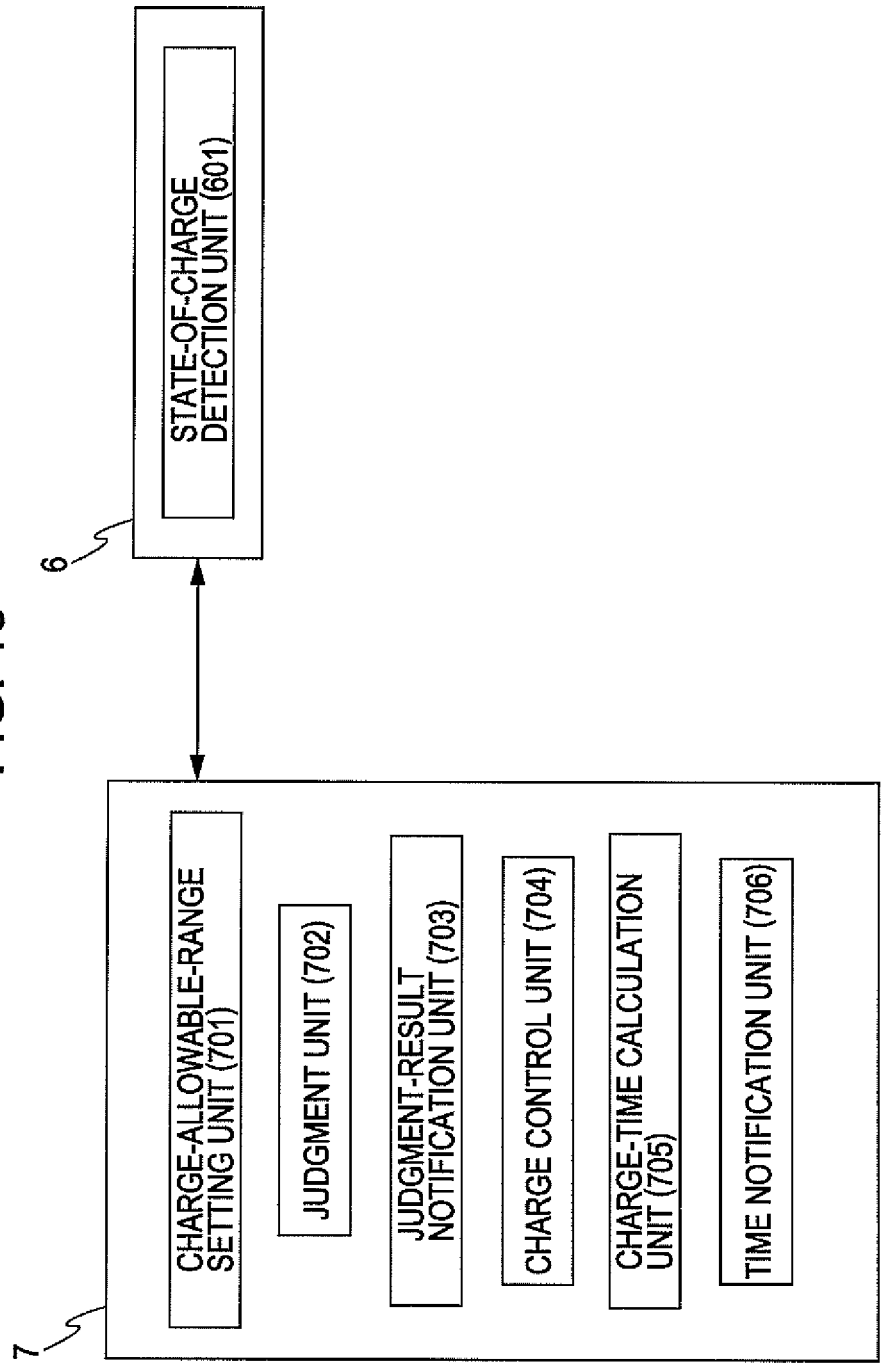
FIG. 15 is a block diagram of a battery controller and an electronic control unit of a non-contact charging system according to a further embodiment of the present invention.

FIG. 15 is a block diagram showing a non-contact charging system according to a further embodiment of the present invention. This embodiment differs from the above-described first embodiment in that a charge-time calculation unit 705 and a time notification unit 706 are provided. The configuration other than these units is similar to that of the second embodiment, and the description is occasionally incorporated.

As shown in FIG. 15, the ECU 7 includes the charge-allowable-range setting unit 701, the judgment unit 702, the judgment-result notification unit 703, the charge control unit 704, the charge-time calculation unit 705, and the time notification unit 706. The charge-allowable-range setting unit 701 sets the charge allowable range in accordance with the SOC. The charge-time calculation unit 705 calculates the charge time (T1) to the full charge in accordance with the position of the power transmitting coil 1A with respect to the power receiving coil 1B and the SOC. Also, the charge-time calculation unit 705 calculates the charge time (T2) based on the SOC if the power receiving coil 1B is arranged at the position corresponding to the position of the power transmitting coil 1A. The charge time (T1) indicates the charge time for the coil position in the current parking state of the vehicle. The charge time (T2) indicates the charge time for the coil position in the ideal parking state. The ECU 7 has previously set therein the time difference (ΔTc) for comparison with the time difference (ΔT) between the charge time (T1) and the charge time (T2). The time difference (ΔTc) represents the time difference with respect to the charge time allowable with respect to the charge time (T2).

Here, the charge allowable range and the time difference (ΔTc) each indicate the allowable degree of the positional shift of the coil with respect to the ideal vehicle state respectively in terms of the spatial range and time. The time difference (ΔTc) is set so that the allowable degree of the positional shift of the coil is increased with respect to the charge allowable range. For example, in SOC of a certain value, even when the position of the power transmitting coil 1A is detected outside the charge allowable range, if the time difference (ΔT) between the charge time (T1) and the charge time (T2) is smaller than the time difference (ΔTc), it is determined that the positional shift of the coil is smaller than the allowable degree, and the charge is allowed.

Figure 16:
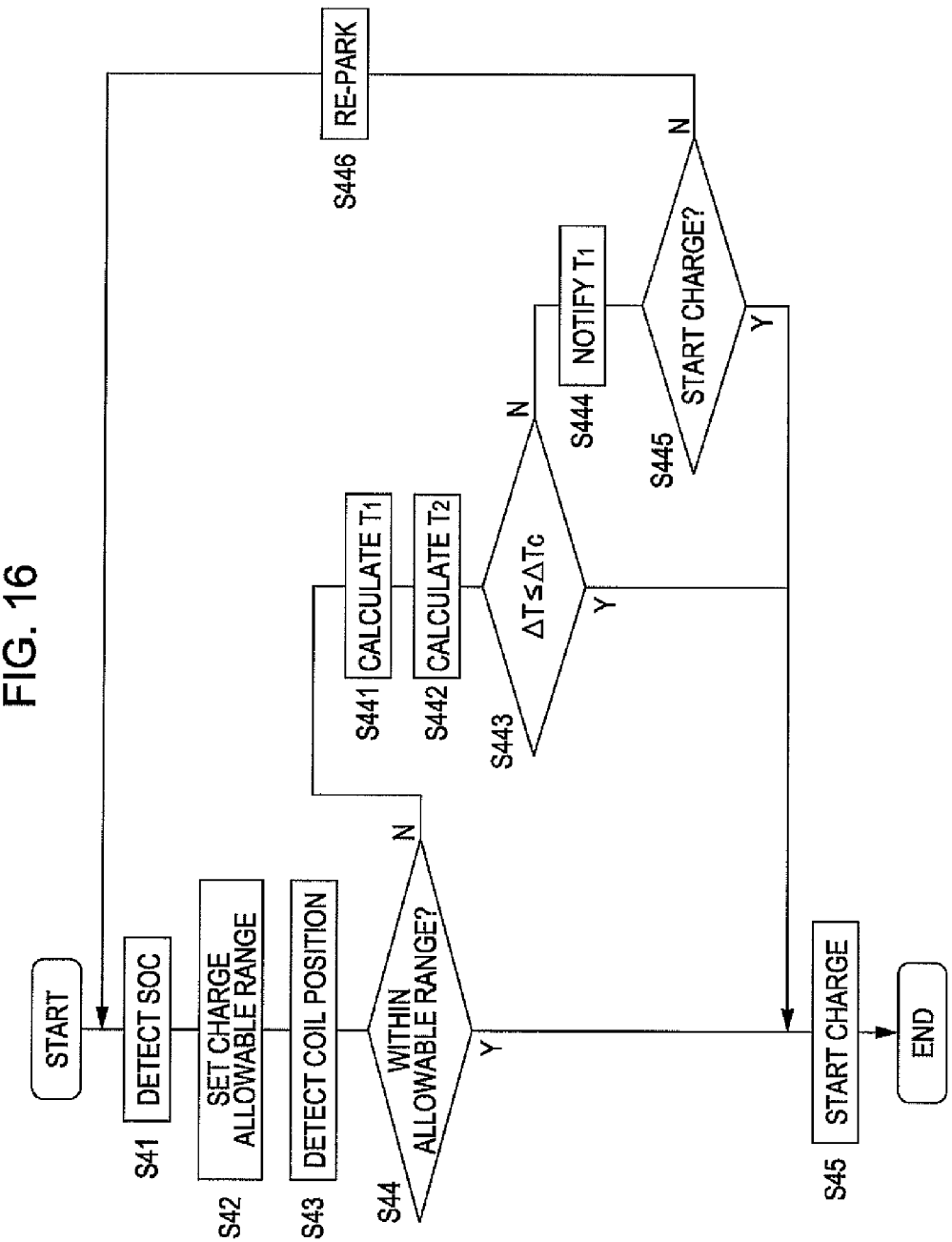
FIG. 16 is a flowchart showing a control procedure of the non-contact charging system in FIG. 15.

Next, a control procedure of the non-contact charging system according to this embodiment is described with reference to FIG. 16. FIG. 16 is a flowchart showing a control procedure of the non-contact charging system according to this embodiment. When the control by the non-contact charging system according to this embodiment is started, in step S41, the state-of-charge detection unit 601 detects the SOC of the battery 5, and transmits information of the detected SOC to the ECU 7. In step S42, the charge-allowable-range setting unit 701 sets the charge allowable range in accordance with the detected SOC. In step S43, the ECU 7 detects the position of the transmitting coil 1A through the ground-side communication device 8A and the vehicle-side communication device 8B. In step S44, the judgment unit 702 judges whether the position of the power transmitting coil 1A is within the charge allowable range or not.

If the position of the power transmitting coil 1A is within the charge allowable range, in step S45, the charge control unit 704 starts the charge for the battery 5 by setting the charge power in accordance with the SOC of the battery 5 and the reception power of the power receiving coil 1B, and feeding the charge power to the battery 5.

In contrast, if the position of the power transmitting coil 1A is not within the charge allowable range, in step S441, the charge-time calculation unit 705 calculates the charge time (T1) in accordance with the detected position of the power transmitting coil 1A and the SOC. In step S442, the charge-time calculation unit 705 calculates the charge time (T2) in accordance with the SOC. In step S443, the ECU 7 calculates the time difference (ΔT) between the charge time (T1) and the charge time (T2), and compares the time difference (ΔT) with the previously set time (ΔTc). If the time difference (ΔT) is equal to or smaller than the time (ΔTc), even though the position of the coil is outside the charge allowable range, the ECU 7 determines that the charge can be completed within the previously set allowable time. The charge control unit 704 starts the charge for the battery 5 by setting the charge power in accordance with the SOC of the battery 5 and the reception power of the power receiving coil 1B, and feeding the charge power to the battery 5 (step S45).

In contrast, if the time difference (ΔT) is larger than the time difference (ΔTc), the ECU 7 determines that the charge cannot be completed within the previously set allowable time. The time notification unit 706 notifies the occupant about the charge time (T1) by displaying the charge time (T1) on the display or the like of the navigation device (step S444). In step S445, the occupant determines whether the charge for the charge time (T1) is performed or not. If the occupant determines that the charge for the battery 5 may take the charge time (T1), operates the charge start button (not shown) or the like, and hence starts the charge, the processing goes to step S45. If the occupant determines that the charge for the charge time (T1) is not performed, the driver re-parks the vehicle in step S446, and the processing returns to step S41.

Then, when the SOC of the battery 5 becomes the full charge, the control by the non-contact charging system according to this embodiment is ended.

As described above, the non-contact charging device according to this embodiment includes the power receiving coil 1B, the vehicle-side electric circuit 2B, the battery 5, the state-of-charge detection unit 601, the communication devices 8A and 8B, the charge-allowable-range setting unit 701, and the charge-time calculation unit 705; sets the charge allowable range, which indicates the range of the position of the power transmitting coil 1A for allowing the charge for the battery, with respect to the position of the power receiving coil 1B, in accordance with the SOC; and calculates the charge time (T1) of the battery 5 in accordance with the detected position of the power transmitting coil 1A and the SOC. With this embodiment, since the charge allowable range and the charge time are calculated, and the allowance of the charge is judged based on both the calculated values, judgment accuracy can be increased, and hence the convenience for the user can be increased.

The non-contact charging system according to this embodiment may be a system that calculates the charge time (T3) and the charge time (T4) and has the additional control processing in step S26, step S27, and step S261 to step S263 like the non-contact charging system according to the third embodiment, or may be a system that calculates the charge time (T5) and the parking time (Tp) and has the additional control processing in step S37, step S38, and step S371 to step S373 like the non-contact charging system according to the fourth embodiment.

The invention claimed is:

1. A non-contact charging device, comprising:
a power receiving device including a power receiving coil that receives power from a power transmitting coil in a non-contact manner through at least magnetic coupling;
a battery that is charged with the power;
state-of-charge detection means for detecting a state of charge of the battery;
position detection means for detecting a position of the power transmitting coil; and
charge-time calculation means for calculating a first charge time that would be required to charge the battery in accordance with the state of charge detected by the state-of-charge detection means and a first position of the power transmitting coil detected by the position detection means.

2. The non-contact charging device according to claim 1, wherein the charge-time calculation means increases the first charge time as a shift of the first position of the power transmitting coil with respect to a position of the power receiving coil becomes larger.

3. The non-contact charging device according to claim 1, wherein the charge-time calculation means calculates a second charge time that would be required to charge the battery if the power receiving coil is arranged at a second position corresponding to the position of the power transmitting coil in accordance with the state of charge detected by the state-of-charge detection means.

4. The non-contact charging device according to claim 3, further comprising charge-time notification means for making notification about at least the first charge time if a time difference between the first charge time and the second charge time is larger than a predetermined time difference.

5. The non-contact charging device according to claim 3, further comprising:
consumption calculation means for calculating a consumption of the battery to be consumed when a vehicle including the power receiving device is re-parked and the power receiving coil is moved to the second position,
wherein the charge-time calculation means calculates a third charge time that would be required to charge a volume of the battery corresponding to the consumption calculated by the consumption calculation means.

6. The non-contact charging device according to claim 5, further comprising:
charge-time notification means for making notification about a charge time,
wherein the charge-time calculation means calculates a fourth charge time that would be required to charge the battery by adding the third charge time to the second charge time, and
wherein the charge-time notification means makes notification about the first charge time and the fourth charge time if the fourth charge time is shorter than the first charge time.

7. The non-contact charging device according to claim 5, further comprising:
charge control means for controlling charge for the battery,
wherein the charge-time calculation means calculates a fourth charge time by adding the third charge time to the second charge time, and
wherein the charge control means starts the charge for the battery in a state in which the power transmitting coil is arranged at the first position if the fourth charge time is longer than the first charge time.

8. The non-contact charging device according to claim 5, further comprising parking-time calculation means for calculating a parking time for parking the vehicle including the power receiving device to move the power receiving coil to the second position.

9. The non-contact charging device according to claim 8, further comprising:
charge-time notification means for making notification about a charge time,
wherein the charge-time calculation means calculates a fifth charge time by adding the third charge time and the parking time to the second charge time, and
wherein the charge-time notification means makes notification about the first charge time and the fifth charge time if the fifth charge time is shorter than the first charge time.

10. The non-contact charging device according to claim 8, further comprising:
charge control means for controlling charge for the battery,
wherein the charge-time calculation means calculates a fifth charge time by adding the third charge time and the parking time to the second charge time, and
wherein the charge control means starts the charge for the battery in a state in which the power transmitting coil is arranged at the first position if the fifth charge time is longer than the first charge time.

11. The non-contact charging device according to claim 8, further comprising:
   re-parking notification means for outputting notification for recommending a driver of the vehicle to perform re-parking,
   wherein the charge-time calculation means calculates a fifth charge time by adding the third charge time and the parking time to the second charge time, and
   wherein the re-parking notification means outputs the notification for the recommendation of the re-parking if the fifth charge time is shorter than the first charge time.

12. The non-contact charging device according to claim 1, further comprising:
   charge control means for controlling charge power of the battery in accordance with the state of charge detected by the state-of-charge detection means, and
   wherein the charge control means decreases the charge power stepwise as the state of charge becomes higher.

13. The non-contact charging device according to claim 7, wherein the charger control means controls charge power of the battery in accordance with the state of charge detected by the state-of-charge detection means and decreases the charge power stepwise as the state of charge becomes higher.

* * * * *